United States Patent
Wang

(10) Patent No.: US 8,489,663 B2
(45) Date of Patent: Jul. 16, 2013

(54) DECIMAL FLOATING-POINT ADDER WITH LEADING ZERO ANTICIPATION

(75) Inventor: Liang-Kai Wang, Austin, TX (US)

(73) Assignee: Advanced Micro Devices, Sunnyvale, CA (US)

( * ) Notice: Subject to any disclaimer, the term of this patent is extended or adjusted under 35 U.S.C. 154(b) by 1076 days.

(21) Appl. No.: 12/479,531

(22) Filed: Jun. 5, 2009

(65) Prior Publication Data

US 2010/0312812 A1    Dec. 9, 2010

(51) Int. Cl.
  *G06F 7/42* (2006.01)
  *G06F 7/00* (2006.01)
(52) U.S. Cl.
  USPC ........... 708/505; 708/501; 708/502; 708/503; 708/504
(58) Field of Classification Search
  USPC ................................. 708/501–505
  See application file for complete search history.

(56) References Cited

U.S. PATENT DOCUMENTS

| | | | |
|---|---|---|---|
| 5,493,520 A | 2/1996 | Schmookler | |
| 5,928,319 A | 7/1999 | Haller | |
| 6,542,915 B1 * | 4/2003 | Dibrino et al. | 708/501 |
| 7,822,799 B1 * | 10/2010 | Langhammer et al. | 708/551 |
| 7,899,860 B2 * | 3/2011 | Visalli et al. | 708/710 |
| 8,131,795 B2 * | 3/2012 | Dhong et al. | 708/505 |
| 8,239,441 B2 * | 8/2012 | Rarick | 708/523 |
| 8,260,837 B2 * | 9/2012 | Powell et al. | 708/501 |
| 8,429,217 B2 * | 4/2013 | Schmookler | 708/504 |

OTHER PUBLICATIONS

J. D. Bruguera and T. Lang; "Leading-one prediction with concurrent position correction;" IEEE Transactions on Computers, vol. 48, No. 10; pp. 1083-1097, Oct. 1999.

M. F. Cowlishaw; "Decimal arithmetic FAQ: Part 1—general questions;" http://speleotrove.com/decimal/decifaq.html; downloaded from the Internet Oct. 13, 2009.

A. Y. Duale, M. H. Decker, H.-G. Zipperer, M. Aharoni, and T. J. Bohizic; "Decimal Floating-point in z9: An implementation and testing perspective;" IBM Journal of Research and Development, vol. 51, No. 1/2; pp. 217-228, Jan./Mar. 2007.

L. Eisen, J.W.Ward III, H.-W. Tast, N. Mading, J. Leenstra, S. M. Mueller, C. Jacobi, J. Preiss, E. M. Schwarz, and S. R. Carlough; "IBM POWER6 accelerators: VMX and DFU;" IBM Journal of Research and Development, vol. 51, No. 6, pp. 663-684, Nov. 2007.

E. Hokenek and R. K. Montoye; "Leading-zero anticipator (LZA) in the IBM RISC System/6000 Floating-point execution unit;" IBM Journal of Research and Development, vol. 34, No. 1; pp. 71-77, Jan. 1990.

(Continued)

*Primary Examiner* — Tammara Peyton
(74) *Attorney, Agent, or Firm* — Meyertons Hood Kivlin Kowert & Goetzel; Mark K. Brightwell

(57) ABSTRACT

A decimal floating-point (DFP) adder includes a decimal leading-zero anticipator (LZA). The DFP adder receives DFP operands. Each operand includes a significand, an exponent, a sign bit and a leading zero count for the significand. The DFP adder adds or subtracts the DFP operands to obtain a DFP result. The LZA determines the leading zero count associated with the significand of the DFP result. The LZA operates at least partially in parallel with circuitry (in the DFP adder) that computes the DFP result. The LZA does not wait for that circuitry to finish computation of the DFP result. Instead it "anticipates" the number of leading zeros that the result's significand will contain.

18 Claims, 27 Drawing Sheets

OTHER PUBLICATIONS

M. Cowlishaw; "General decimal arithmetic testcases;" http://speleotrove.com/decimal/dectest.pdf; downloaded from the Internet Oct. 13, 2009.

M. Cowlishaw; "The decNumber C library;" http://speleotrove.com/decimal/decnumber.pdf; downloaded from the Internet Oct. 13, 2009.

"IEEE Standard for Floating-Point Arithmetic;" IEEE Computer Society; New York, NY; Aug. 29, 2008.

"Intel decimal floating-point math library;" http://software.intel.com/en-us/articles/intel-decimal-floating-point-math-library/; pp. 1-65; Oct. 2008; downloaded from the Internet Oct. 13, 2009.

"C# language specification, section 4.1.7; The decimal type;" Microsoft Corporation; 2009. http://msdn.microsoft.com/en-us/library/aa691147(VS.71).aspx; downloaded from the Internet Oct. 13, 2009.

H. Nikmehr, B. Phillips, and C. C. Lim; "A decimal carryfree adder". In Proceedings of the SPIE Symposium on Smart Materials, Nano-, and Micro-Smart Systems; Bellingham, WA; vol. 5649, pp. 786-797, Feb. 28, 2005.

V. G. Oklobdzija; "An algorithmic and novel design of a leading zero detector circuit: Comparison with logic synthesis;" IEEE Transactions on Very Large Scale Integration (VLSI) Systems, vol. 2, No. 1, pp. 124-128, Mar. 1994.

M. S. Schmookler and A. W. Weinberger; "High speed decimal addition;" IEEE Transactions on Computers, vol. C-20, No. 8, pp. 862-867, Aug. 1971.

E. M. Schwarz, J. Kapernick, and M. Cowlishaw; Decimal Floating-point support on the IBM z10 processor. IBM Journal of Research and Development, 53(1), 2009.

"The BigDecimal Class of Java Platform 1.1 API Specification", Sun Microsystems, Inc.; 1999, http://java.sun.com/products/archive/jdk/1.1/; downloaded from the Internet Oct. 19, 2009.

"The BigDecimal class of Java 2 platform standard edition 5.0, API specification;" Sun Microsystems, Inc.; 2004; http://java.sun.com/j2se/1.5.0/docs/api/java/math/BigDecimal.html; downloaded from the internet Oct. 19, 2009.

J. Thompson, M. J. Schulte, and N. Karra; "A 64-bit decimal floating-point adder;" in Proceedings of the IEEE Computer Society Annual Symposium on VLSI, Lafayette, LA,, Feb. 2004.

C. Tsen, S. Gonzalez-Navarro, and M. J. Schulte. Hardware design of a binary integer decimal-based floating-point adder. Proceedings of the 25th IEEE International Conference on Computer Design, 2007.

L.-K. Wang and M. J. Schulte. Decimal floating-point adder and multifunction unit with injection-based rounding. in Proceedings of the 18th IEEE Symposium on Computer Arithmetic, Montpellier, France, Jun. 2007.

L.-K. Wang, M. J. Schulte, J. D. Thompson, and N. Jairam. Hardware designs for decimal floating-point addition and related operations. IEEE Transactions on Computers, 58(3), Mar. 2009.

C. F. Webb. IBM z10: The next-generation mainframe microprocessor. IEEE Micro, 28(2):19-29, Mar./Apr. 2008.

\* cited by examiner

| Internal Format 100 | S | Exponent | Significand | Special Value Flags | Leading Zero Count |
|---|---|---|---|---|---|
| | 1-bit | $N_E$ bits | $N_S$ bits | $N_F$ bits | $N_L$ bits |

| Example 110 of Internal Format | S | Exponent | Significand | Special Value Flags | Leading Zero Count |
|---|---|---|---|---|---|
| | 1-bit | 10-bit | 64-bit | 4-bit | 4-bit |

*FIG. 1C*

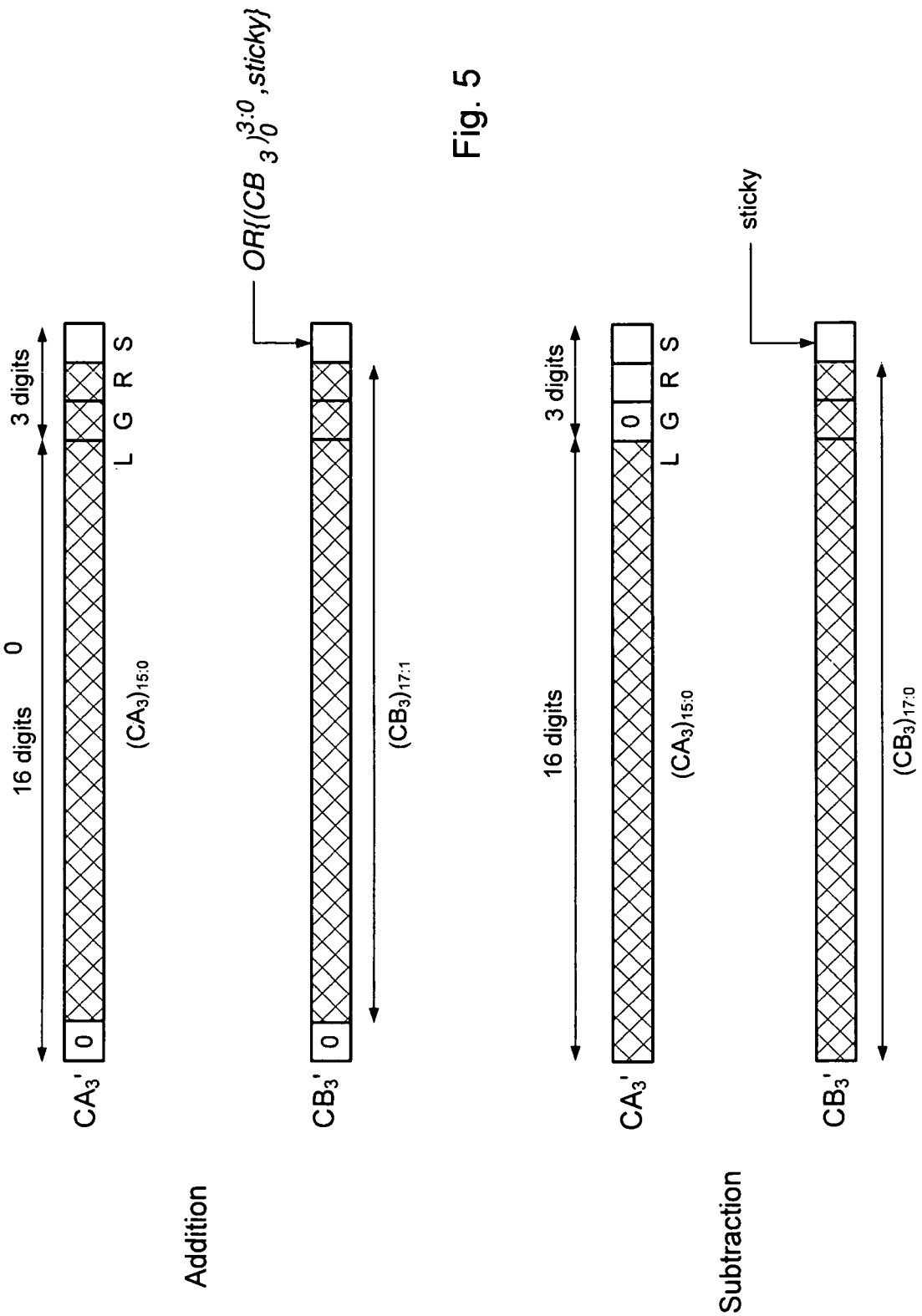

| $Sign_{inj}$ | Rounding Modes | Injection Value (R, S) |
|---|---|---|
| ? | roundTowardZero | (0 , 0) |
| ? | roundTiesToAway | (5 , 0) |
| ? | roundTiesToZero | (4 , 9) |
| ? | roundTiesToEven | (5 , 0) |
| - | roundTowardPositive | (0 , 0) |
| + | roundTowardPositive | (9 , 9) |
| - | roundTowardNegative | (9 , 9) |
| + | roundTowardNegative | (0 , 0) |
| ? | roundAwayZero | (9 , 9) |

Fig. 6

$$Sign_{inj} = \left((EOP \wedge swap) \wedge (Operation \oplus SB)\right) \vee \left(\overline{(EOP \wedge swap)} \wedge SA\right)$$

Fig. 7

ADD: $(flagADD_0)_i = ((UCR)_i \equiv 15) \vee ((UCR)_i \equiv 9) \wedge ((C_1)_{i+1} \equiv 1)$, SUB: $(flagSUB_0)_i = \begin{cases} \text{For } i = 4 \\ \quad ((UCR)_4 \equiv 15) \wedge (P_3 \equiv 0) \\ \quad \vee ((UCR)_4 \equiv 14) \wedge (P_3 \equiv 1) \\ \text{For } i = 5 \ldots 19 \\ \quad ((UCR)_i \equiv 15) \end{cases}$

Fig. 9

Rows 7-10 ($1 \leq j \leq 4$)

$(\text{flagADD}_j)_i = (\text{flagADD}_{j-1})_i \wedge (\text{flagADD}_{j-1})_{i-2^{\wedge}(j-1)}$, $(\text{flagSUB}_j)_i = (\text{flagSUB}_{j-1})_i \wedge (\text{flagSUB}_{j-1})_{i-2^{\wedge}(j-1)}$, $$F_2 = \begin{cases} \text{flagADD}_4, & \text{if EOP is ADD} \\ \text{flagSUB}_4, & \text{if EOP is SUB.} \end{cases}$$

Fig. 10

If (MSB of $C_1 \equiv 1$) // (positive result)
    (A) Invert bits in UCR for which the corresponding
        bit in $F_1$ is one.
    (B) Add "1010" (correction of -6) to the above result in
        digit position i if $(C_1)_{i+1}$ XOR $\equiv 0$
Else // (negative result)
    (A) Invert all sum bits
    (B) Add "1010" to the above result in
        digit position i if $(C_1)_{i+1} \equiv 1$.

Fig. 11

| $Sign_{inj}$ | Rounding Modes | Injection Correction Value (G, R, S) |
|---|---|---|
| ? | roundTowardZero | (0, 0, 0) |
| ? | roundTiesToAway | (4, 5, 0) |
| ? | roundTiesToZero[1] | (4, 5, 0) |
| ? | roundTiesToEven | (4, 5, 0) |
| - | roundTowardPositive | (0, 0, 0) |
| + | roundTowardPositive | (9, 0, 0) |
| - | roundTowardNegative | (9, 0, 0) |
| + | roundTowardNegative | (0, 0, 0) |
| ? | roundAwayZero[1] | (9, 0, 0) |

Fig. 12

Step 1:

$z_{0,j} = zm_j \wedge zm_{j-1}$ $p_{0,j} = (zm_j \vee pm_j) \wedge pm_{j-1}$ $y_{0,j} = gm_j \vee (zm_j \vee pm_j) \wedge gm_{j-1}$ Step 2 (through a four-level binary tree with L = 1 to 4):

$z_{L,j} = z_{L-1,2j+1} \wedge z_{L-1,2j}$ $p_{L,j} = (z_{L-1,2j+1} \vee p_{L-1,2j+1}) \wedge p_{L-1,2j}$ $y_{L,j} = y_{L-1,2j+1} \vee (z_{L-1,2j+1} \vee p_{L-1,2j+1}) \wedge y_{L-1,2j}$ $Y_{add} = y_{4,0}$

Fig. 14A

| $(W)_i$ | $(carry)_i$ | $(sum)_i$ | Symbol Asserted |
|---|---|---|---|
| -9 | 0 | 0110 | $s2_i, s9_i$ |
| -8 | 0 | 0111 | $s2_i$ |
| -7 | 0 | 1000 | |
| -6 | 0 | 1001 | |
| -5 | 0 | 1010 | |
| -4 | 0 | 1011 | |
| -3 | 0 | 1100 | |
| -2 | 0 | 1101 | |
| -1 | 0 | 1110 | $s1_i$ |
| 0 | 0 | 1111 | $zero_i$ |
| +1 | 1 | 0000 | $g1_i$ |
| +2 | 1 | 0001 | $g2_i$ |
| +3 | 1 | 0010 | |
| +4 | 1 | 0011 | |
| +5 | 1 | 0100 | |
| +6 | 1 | 0101 | |
| +7 | 1 | 0110 | |
| +8 | 1 | 0111 | |
| +9 | 1 | 1000 | |

*FIG. 16*

| Digit Pattern of $W$ | LZC Count | Substring Pattern | Boolean Equation |
|---|---|---|---|
| $0^k[2,9][-9,9]^m$ | $k$ | $[2,9]$ | $g2_i$ |
| $0^k1[1,9][-9,9]^m$ | $k$ | $1[1,9]$ | $g1_i \wedge g1_{i-1} \wedge g2_{i-1}$ |
| $0^k10^t[0,9][-9,9]^m$ | $k$ | $10$ | $g1_i \wedge zero_{i-1}$ |
| $0^k10^t[-9,-1][-9,9]^m$ | $k+1$ | $10^t$ | $g1_i \wedge zero_{i-1}$ |
| $0^k1[-8,-1][-9,9]^m$ | $k+1$ | $1[-8,-1]$ | $g1_i \wedge s1_{i-1} \wedge s2_{i-1} \wedge \overline{s9}_{i-1}$ |
| $0^k1(-9)^j[1,9][-9,9]^m$ | $k+j$ | $(-9)[1,9]$ | $s9_i \wedge g1_{i-1} \wedge g2_{i-1}$ |
| $0^k1(-9)^j[-8,-1][-9,9]^m$ | $k+j+1$ | $(-9)[-8,-1]^t$ | $s9_i \wedge s1_{i-1} \wedge s2_{i-1} \wedge \overline{s9}_{i-1}$ |
| $0^k1(-9)^j0^t[0,9][-9,9]^m$ | $k+j$ | $(-9)0$ | $s9_i \wedge zero_{i-1}$ |
| $0^k1(-9)^j0^t[-9,-1][-9,9]^m$ | $k+j+1$ | $(-9)0^t$ | $s9_i \wedge zero_{i-1}$ |

FIG. 17

| Digit Pattern of $W$ | LZC Count | Substring Pattern | Boolean Equation |
|---|---|---|---|
| $0^k[-9,-2][-9,9]^m$ | $k$ | $[-9,-2]$ | $s2_i$ |
| $0^k(-1)[-9,-1][-9,9]^m$ | $k$ | $(-1)[-9,-1]$ | $s1_i \wedge s1_{i-1} \wedge \overline{s2_{i-1}}$ |
| $0^k(-1)0[-9,-1][-9,9]^m$ | $k$ | $(-1)0$ | $s1_i \wedge zero_{i-1}$ |
| $0^k(-1)0^t[-9,-1][-9,9]^m$ | $k+1$ | $(-1)0^t$ | $s1_i \wedge zero_{i-1}$ |
| $0^k(-1)0^t[1,9][-9,9]^m$ | $k+1$ | $(-1)[1,8]$ | $s1_i \wedge g1_{i-1} \wedge g2_{i-1} \wedge \overline{s9_{i-1}}$ |
| $0^k(-1)[1,8][-9,9]^m$ | $k+j$ | $9[-9,-1]$ | $g9_i \wedge s1_{i-1} \wedge s2_{i-1}$ |
| $0^k(-1)9^j[-9,-1][-9,9]^m$ | $k+j$ | $9[1,8]$ | $g9_i \wedge g1_{i-1} \wedge g2_{i-1} \wedge \overline{s9_{i-1}}$ |
| $0^k(-1)9^j[1,8][-9,9]^m$ | $k+j+1$ | $90$ | $g9_i \wedge zero_{i-1}$ |
| $0^k(-1)9^j0[-9,-1][-9,9]^m$ | $k+j+1$ | $90^l$ | $g9_i \wedge zero_{i-1}$ |
| $0^k(-1)9^j0^t[1,9][-9,9]^m$ | | | |

*Fig. 18*

$$P_i = \frac{\overline{zero_{i+1}} \wedge \left( \begin{array}{c} g2_i \vee s2_i \vee g1_i \wedge \overline{s9_{i-1}} \\ s1_i \wedge \overline{g9_{i-1}} \end{array} \right) \vee}{\overline{zero_{i+1}} \wedge (s9_i \wedge \overline{s9_{i-1}} \vee g9_i \wedge \overline{g9_{i-1}})}$$

*Fig. 19*

$$p\_pos_i = g1_i \wedge \overline{s9_{i-1}} \vee s9_i \wedge \overline{s9_{i-1}}$$

$$n\_pos_i = zero_{i+1} \wedge s9_i \vee s1_i \vee s2_i \wedge \overline{s9_i}$$

$$z\_pos_i = (g1_i \vee s9_i) \wedge s9_{i-1} \vee zero_i$$

Fig. 20

$$p\_neg_i = s1_i \wedge \overline{g9_{i-1}} \vee g9_i \wedge \overline{g9_{i-1}}$$

$$n\_neg_i = zero_{i+1} \wedge g9_i \vee g1_i \vee g2_i \wedge \overline{g9_i}$$

$$z\_neg_i = (s1_i \vee g9_i) \wedge g9_{i-1} \vee zero_i$$

Fig. 22

$$Tz_{L,i} = Tz_{L-1,2i+2^{L-1}} \wedge Tz_{L-1,2i}$$

$$Tp_{L,i} = Tz_{L-1,2i+2^{L-1}} \wedge Tp_{L-1,2i} \vee Tp_{L-1,2i}$$

$$Tn_{L,i} = Tz_{L-1,2i+2^{L-1}} \wedge Tn_{L-1,2i} \vee Tn_{L-1,2i} $$

$$Ty_{L,i} = Ty_{L-1,2i+2^{L-1}} \vee Tz_{L-1,2i+2^{L-1}} \wedge Ty_{L-1,2i} \vee Tp_{L-1,2i+2^{L-1}} \wedge Tn_{L-1,2i}$$

Fig. 21

$$\begin{array}{r} 01004500 \times 10^9 \\ -\ 99511900 \times 10^7 \\ \hline \end{array}$$

$CA_{shift} = 10045000 \times 10^8$
$CB_{shift} = 09951190 \times 10^8$ $\underline{\quad\quad\quad +00093810 \times 10^8 \quad\quad}$ $CA_3\ =\ 10045000$
$CB_3\ =\ F66AEE6F$ $s9_i\ =\ 01100010$
$s2_i\ =\ 01100010$
$s1_i\ =\ 00010100$
$zero_i\ =\ 00000001$
$g1_i\ =\ 10000000$
$g2_i\ =\ 00001000$
$g9_i\ =\ 00000000$ $P_i\ =\ 00100010$

$PLZC_{sub}\ =\ 2$

$p\_pos_i\ =\ 00100010$
$n\_pos_i\ =\ 00010100$
$z\_pos_i\ =\ 11000001$ $Tz_{1,i}\ =\ 1\ \ 0\ \ 0\ \ 0$
$Tp_{1,i}\ =\ 0\ \ 0\ \ 0\ \ 1$
$Tn_{1,i}\ =\ 0\ \ 0\ \ 0\ \ 0$
$Ty_{1,i}\ =\ 0\ \ 1\ \ 0\ \ 0$ $Tz_{2,i}\ =\ 0\ \ \ \ 0$
$Tp_{2,i}\ =\ 0\ \ \ \ 0$
$Tn_{2,i}\ =\ 0\ \ \ \ 0$
$Ty_{2,i}\ =\ 1\ \ \ \ 0$

$Y_{sub,pos} =\ 1$

Fig. 24A $$01044599 \times 10^9$$
$$- 10446000 \times 10^8$$

---

$$CA_{shift} = 10445990 \times 10^8$$
$$CB_{shift} = 10446000 \times 10^8$$

---

$$-10 \times 10^8$$

---

$CA_3$ = 10445990

$CB_3$ = EFBB9FFF

---

$s9_i$ = 00000000

$s2_i$ = 00000000

$s1_i$ = 00001000

$zero_i$ = 11110001

$g1_i$ = 00000000

$g2_i$ = 00000000

$g9_i$ = 00000110

---

$p_i$ = 00000010

$PLZC_{sub}$ = 6

$p\_neg_i$ = 00000010

$n\_neg_i$ = 00000000

$z\_neg_i$ = 11111101

$Tz_{1,i}$ = 1 1 1 0

$Tp_{1,i}$ = 0 0 0 1

$Tn_{1,i}$ = 0 0 0 0

$Ty_{1,i}$ = 0 0 0 0

$Tz_{2,i}$ = 1 0

$Tp_{2,i}$ = 0 1

$Tn_{2,i}$ = 0 0

$Ty_{2,i}$ = 0 0

$Y_{sub\_neg}$ = 0

Fig. 24B $$\begin{array}{r} 00925459 \times 10^9 \\ +\ 00767890 \times 10^8 \\ \hline \end{array}$$

$$CA_{shift} = 09254590 \times 10^8$$
$$CB_{shift} = 00767890 \times 10^8$$
$$\overline{\phantom{CB_{shift}=}10022480 \times 10^8}$$

$$PLZC_{add} = \min(LZCA_{shift}, LZCB_{shift})$$
$$= \min(1, 2) = 1$$

— — — — — — — — — — —

$$CA_3 = 6F8BABF6$$
$$CB_3 = 00767890$$
$$\overline{\phantom{CB_3=}}$$
$$zm_j = 10000001$$
$$pm_j = 01100000$$
$$gm_j = 00011110$$

$$z_{0,j} = 00000000$$
$$p_{0,j} = 11000000$$
$$y_{0,j} = 00111110$$

$$z_{1,j} = 0\ 0\ 0\ 0$$
$$p_{1,j} = 1\ 0\ 0\ 0$$
$$y_{1,j} = 0\ 1\ 1\ 1$$

$$z_{2,j} = 0 \quad\ 0$$
$$p_{2,j} = 0 \quad\ 0$$
$$y_{2,j} = 1 \quad\ 1$$

$$\underline{Y_{add} = 1}$$

Fig. 24C

DECIMAL FLOATING-POINT ADDER WITH LEADING ZERO ANTICIPATION

FIELD OF THE INVENTION

The present invention relates to the field of digital circuit design, and more particularly, to a decimal floating-point adder that includes leading-zero anticipation.

DESCRIPTION OF THE RELATED ART

Although binary floating-point arithmetic is usually sufficient for scientific and statistical applications, it is not adequate for many commercial and monetary applications. Often, these applications use software libraries to perform decimal floating-point (DFP) arithmetic operations. Although these software libraries eliminate the error from representing decimal numbers in binary and correctly emulate decimal rounding, their execution times are slow for numerically intensive commercial applications. Furthermore, decimal numbers in different software libraries are often represented in different formats. Due to the growing importance of DFP arithmetic, specification for it is now included in the IEEE 754-2008 Standard for Floating-Point Arithmetic (hereinafter "IEEE 754-2008"). There exists a need for circuits capable of performing DFP arithmetic such as addition and/or subtraction.

SUMMARY OF THE INVENTION

In one set of embodiments, a system for performing a sum or difference of two decimal floating-point (DFP) operands may include an adder network and a leading zero anticipator (LZA). The adder network may be configured to generate a sum of a first data value and a second data value, where the first and second data values are derived from the first and second DFP operands. The leading zero anticipator may be configured to generate an output value based on data including the first data value, the second data value, a leading zero count of a significand of the first DFP operand, and a leading zero count of a significand of the second DFP operand. The output value is equal to a leading zero count of a significand of a sum or a difference of the first and second DFP operands. The adder network and the LZA may be configured to operate at least partially in parallel. In some embodiments, the adder network may include a parallel prefix network. For example, in one embodiment, the adder network includes a binary Kogge-Stone network.

In some embodiments, the system may also include a preprocessing circuit. The preprocessing circuit may be configured to: receive the significands of the first and second DFP operands; correct the significands based on an effective operation signal in order to obtain corrected operands; conditionally swap the corrected operands based on a swap control signal in order to obtain intermediate operands; and shift the intermediate operands in order to obtain the first and second data values.

In one set of embodiments, a system may be configured for anticipating a number of leading zeros in a significand of a decimal floating-point (DFP) result, wherein the result is a sum or a difference of first and second decimal floating-point (DFP) operands. The system may include an adder array, a subtraction unit, a first anticipator circuit, a second anticipator circuit and a multiplexer. The adder array may be configured to perform a decimal digit addition of a first data value and a second data value to generate a carry operand and a sum operand. The first and second data values may be corrected significands for the first and second DFP operands (e.g., corrected based on the effective operation and to achieve quantum alignment). The subtraction unit may be configured to compute a difference value by subtracting a left shift amount (LSA) and a first count value. The first count value may represent a number of leading zeros in a significand of the first DFP operand.

The first anticipator circuit may be configured to generate a first leading zero count based on the carry operand, the sum operand, the difference value and a second count value. The second count value may represent a number of leading zeros in a significand of the second DFP operand. The second anticipator circuit may be configured to generate a second leading zero count based on data including the carry operand, the sum operand and a shift indication signal. The multiplexer may be configured to select one of the first leading zero count and the second leading zero count based on an effective operation signal that indicates an effective operation.

In some embodiments, the system may also include a parallel prefix network that is configured to add the first and second data values. In one embodiment, the parallel prefix network may include a binary Kogge-Stone network.

In some embodiments, the system may include a shift amount unit that is configured to generate the LSA and the shift indication signal in response to receiving: (a) an exponent of the first DFP operand, (b) an exponent of the second DFP operand, (c) the first count value, and (d) the second count value.

The EOP indicator signal may indicate whether the DFP result corresponds to an effective addition or an effective subtraction. The shift indication signal may indicate whether the second DFP operand is shifted for quantum alignment. (In some embodiments, the shift indication signal is asserted only when the second DFP operand needs to be shifted.)

The system may be included in a microprocessor that is configured to read program instructions from a memory and to execute the program instructions. Alternatively, the system may be included in a dedicated circuit such as an application specific integrated circuit (ASIC).

In some embodiments, the data used by second anticipator circuit may also include an indicator signal that indicates a special operation. For example, the indicator signal may indicate whether the result is zero in effective subtraction, whether both operands are zero, or whether either operand is Infinity, Quiet NaN, or Signaling NaN.

In one set of embodiments, a system for performing leading zero anticipation may include a minimum circuit, a decrementer, a multiplexer and a logic unit. The minimum circuit may be configured to receive a first count value and a second count value. The first count value may represent a leading zero count of a significand of a first decimal floating point (DFP) operand. The second count value may represent a leading zero count of a significand of a second DFP operand. The minimum circuit may be configured to generate a preliminary leading zero count (PLZC) equal to the minimum of the first count value and the second count value.

The decrementer may be configured to decrement the PLZC to obtain a decremented value. The multiplexer may be configured to select one of the PLZC and the decremented value based on a selection control signal. The output of the multiplexer represents a leading zero count of a significand of a sum of the first operand and the second operand. The logic unit may be configured to generate the selection control signal based on a carry operand and a sum operand.

In some embodiments, the logic unit may include a flag generation module configured to generate a propagate indication vector pm, a generate indication vector gm and a zero indication vector zm based on the carry operand and the sum operand. The logic unit may also include a merging module and a logic tree structure. The merging module may be configured to generate intermediate indicator vectors based on the propagate indication vector pm, the generate indication vector gm and the zero indication vector zm. The logic tree structure may be configured to generate the selection control signal based on the intermediate indicator vectors.

In some embodiments, the quantum of the first DFP operand is aligned with the quantum of the second DFP operand. The quantum of a DFP operand is the exponent value of that DFP operand, or equivalently, the weight that is associated with the least significant digit of the significand.

In one set of embodiments, a system for performing leading zero anticipation may include a preliminary encoding module, a logic tree, a first circuit and an output multiplexer. The preliminary encoding module may be configured to generate a set of range indicator vectors based on a carry operand and a sum operand, and to generate a preliminary indicator vector based on the set of range indicator vectors. The carry operand and sum operand represent a result W of a decimal digit addition of a significand of a first DFP operand and a significand of a second DFP operand. The logic tree may be configured to generate a preliminary leading zero count (PLZC) based on the preliminary indicator vector.

The first circuit may be configured to generate two output values based on data including the PLZC, a first sign bit input and a control bit input. One of the two output values equals the PLZC. A second of the two output values equals an alternative value. (In some embodiments, the alternative value may be PLZC+1 or PLZC−1.)

The output multiplexer may be configured to select one of the two output values based on a selection control signal. The selection control signal may be determined based on the set of range indicator vectors and a second sign bit input. The selected output value may represent a leading zero count of a significand of a difference of the first DFP operand and the second DFP operand.

In some embodiments, the system may also include a flag generator module. The flag generator module may be configured to generate a first set of flag vectors and a second set of flag vectors based on the range indicator vectors. The first set of flag vectors may include a zero-digit indicator vector, a leading non-zero digit indicator vector and trailing terminate indicator vector for the result W corresponding to the condition that W is positive. The second set of flag vectors may include a zero-digit indicator vector, a leading non-zero digit indicator vector and a trailing terminate indicator vector for the result W corresponding to the condition that W is negative.

In some embodiments, the system may also include a positive correction tree, a negative correction tree and a second multiplexer. The positive correction tree may be configured to generate a first candidate signal based on the first set of flag vectors. The negative correction tree may be configured to generate a second candidate signal based on the second set of flag vectors. The second multiplexer may be configured to select one of the first and second candidate signals as the selection control signal based on the second sign bit input.

In one embodiment, a quantum of the first DFP operand is aligned with a quantum of the second DFP operand.

In some embodiments, the system includes a first correction tree and a second correction tree. The first correction tree may be configured to compute a first candidate control signal based on first data derived from the range indicator vectors. The second correction tree may be configured to compute a second candidate control signal based on second data also derived from the range indicator vectors. The selection control signal is equal to one of the first candidate control signal or the second candidate control signal, depending on the second sign bit input.

BRIEF DESCRIPTION OF THE DRAWINGS

A better understanding of the present invention can be obtained when the following detailed description of the preferred embodiments is considered in conjunction with the following drawings.

FIG. 1C illustrates an internal format 100 according to one set of embodiments, and an example 110 of the internal format 100.

FIG. 5 illustrates one embodiment of operand placement for DFP addition and subtraction.

FIG. 6 illustrates one embodiment of a table of injection values for different rounding modes.

FIG. 7 illustrates one embodiment of the computation of a Sign value used for an injection mechanism.

FIG. 9 illustrates one embodiment of equations used in row 6 of the trailing-nine detection shown in FIG. 8.

FIG. 10 illustrates one embodiment of equations used in rows 7-10 of the trailing-nine detection shown in FIG. 8.

FIG. 11 illustrates one embodiment of rules for performing post-correction, to convert the uncorrected result UCR to binary coded decimal.

FIG. 12 illustrates one embodiment of a table of injection correction values for different rounding modes.

FIG. 14A illustrates one embodiment of the computation of a selection control signal $Y_{add}$.

FIG. 16 illustrates one embodiment of a truth table used by pre-encoding unit 1512.

FIG. 17 illustrates one embodiment of a table showing digit patterns and corresponding Boolean equations for positive W.

FIG. 18 illustrates one embodiment of a table showing digit patterns and corresponding Boolean equations for negative W.

FIG. 19 illustrates one embodiment of a computation of the P vector.

FIG. 20 illustrates one embodiment of equations used to compute vectors p_pos, n_pos and z_pos.

FIG. 21 illustrates one embodiment of equations used in a correction tree.

FIG. 22 illustrates one embodiment of equations used to computer vectors p_neg, n_neg and z_neg.

FIGS. 24A-C illustrates examples of leading zero anticipation for DFP operands having eight-digit significands.

Figures 1A, 1B:
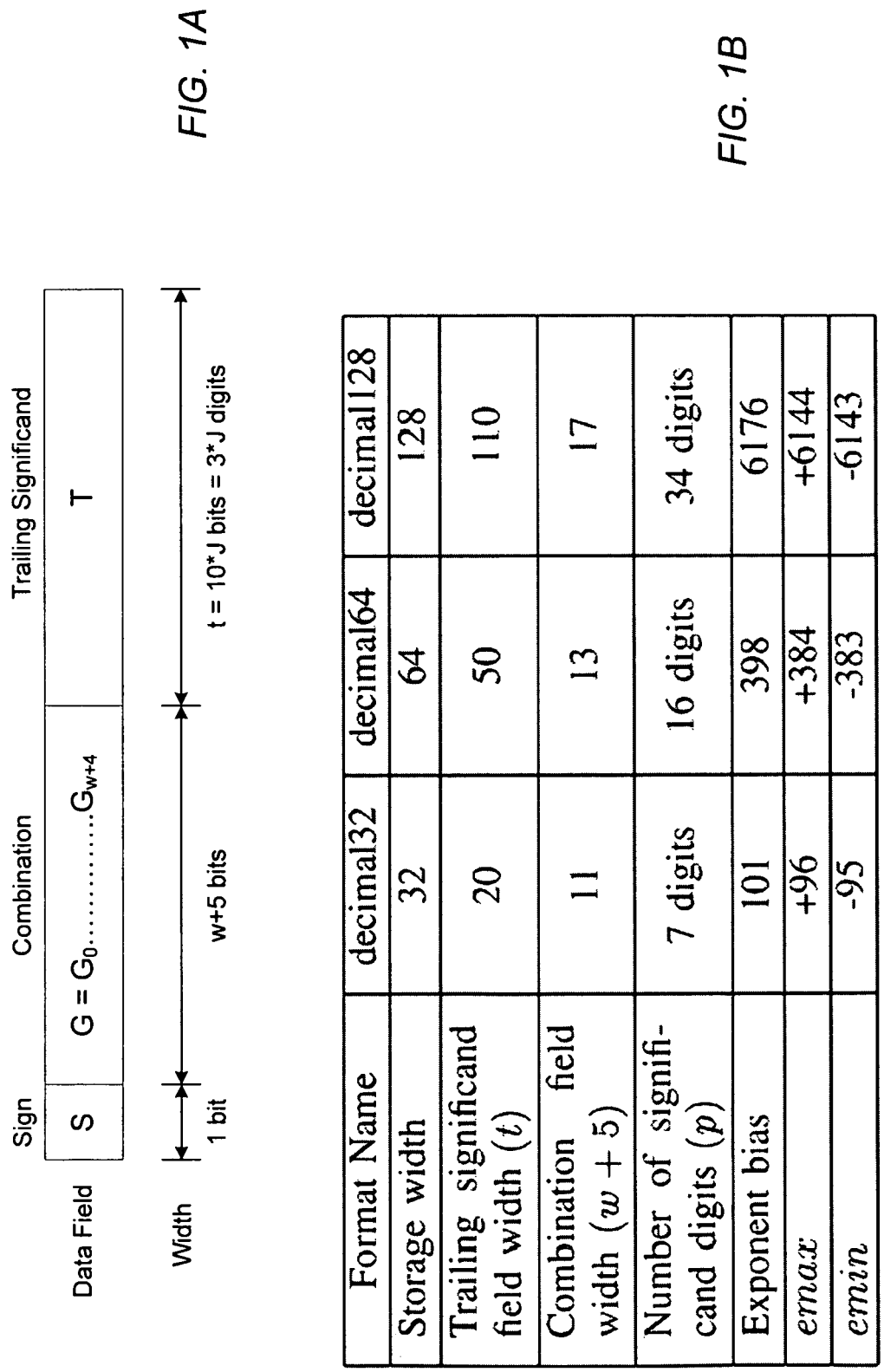
FIG. 1A illustrates the decimal interchange floating-point format.
FIG. 1B illustrates parameters of the decimal interchange floating-point format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Formats for Decimal Floating-Point

IEEE 754-2008 was approved in June 2008. It is a revision of the IEEE 754 Standard for Binary Floating-Point (BFP) Arithmetic (ratified in 1985). IEEE 754-2008 specifies decimal interchange formats that may be used for storing data and for exchanging data. These formats are designed for storage efficiency. Numbers expressed in any of these formats may be converted to an internal format before they are manipulated by a processing device. IEEE 754-2008 defines a 32-bit storage format that is referred to as "decimal32". IEEE 754-2008 also defines 64-bit and 128-bit basic formats that are referred to as "decimal64" and "decimal128", respectively. The decimal64 and decimal128 formats may be used for both storage and computation.

In IEEE 754-2008, the value of a finite DFP number having an integer significand is given by: $y=(-1)^s \times C \times 10^e$, where "×" denotes multiplication, where S represents the sign, e represents the unbiased exponent, and C represents the significand. The significand C is a nonnegative integer of the form $c_0 c_1 c_2 \ldots c_{p-1}$ with $c_i$ in the interval [0,10). The parameter p represents the precision (or length) of the significand. The precision is equal to 7, 16, or 34 digits, for decimal32, decimal64, or decimal128, respectively.

The IEEE 754-2008 decimal interchange format is illustrated by the field diagram in FIG. 1A. The decimal interchange format includes a 1-bit sign field S to store the sign of the number. The (w+5)-bit combination field G provides the most significand digit (MSD) of the significand and a nonnegative biased exponent E. The biased exponent E is related to exponent e by the expression E=e+bias. The G field also indicates special values such as infinity and Not-a-Number (NaN). The remaining digits of the significand are specified in the trailing significand field T (which is t bits wide). IEEE 754-2008 specifies two encodings for the trailing significand field. In the first encoding, the significant is encoded using a decimal encoding, also known as the densely packed decimal (DPD) encoding. The second encoding uses a binary integer significand, and is commonly referred to as the binary integer decimal (BID) encoding. IEEE 754-2008 refers to the BID encoding as the binary encoding of DFP numbers and it refers to the DPD encoding as the decimal encoding of DFP numbers. Additional information regarding the DPD and BID encodings is provided in IEEE 754-2008.

FIG. 1B is table that specifies for each decimal format the parameters used in IEEE 754-2008. Widths are given in bits. The values emin and emax are respectively the minimum and maximum unbiased exponents.

Rounding Modes and Decimal-Specific Operations

IEEE 754-2008 specifies five rounding modes. (1) RoundTiesToEven rounds the result to the nearest representable floating-point number and selects the number with an even LSD whenever a tie occurs. (2) RoundTiesToAway rounds the result to the nearest representable floating-point number and selects the number with the larger magnitude if a tie occurs. (3) RoundTowardPositive rounds the result toward positive infinity. (4) RoundTowardNegative rounds the result toward negative infinity. (4) RoundTowardZero truncates the result.

In one set of embodiments, a DFP adder may include a decimal leading-zero anticipator (LZA). The DFP adder receives DFP operands, where each of the operands is accompanied by a corresponding leading zero count (LZC). The DFP adder generates a resultant value, e.g., the sum or difference of the operands. The LZA determines the LZC of the resultant value. The LZC of the resultant value is generated in parallel (or partially in parallel) with the resultant value. (Thus, the LZA does not compute the LZC of the resultant value by the crude method of operating on the resultant value.) The resultant value along with its LZC may be supplied to one or more other downstream operational units for additional DFP operations.

In some embodiments, a digital system such as a computer system or a custom designed circuit may include a set of operational units and a memory. The operational units may use an internal format for input and output operands, i.e., a format where the LZC of each operand is provided along with the operand. In other words, each operational unit is configured to receive operands along with their corresponding LZCs, and to generate an output along with its corresponding LZC. The memory of the digital system may store operands in a different format, e.g., in either one of the DFP encodings specified in the IEEE 754-2008 Standard for Floating-Point Arithmetic (hereinafter "IEEE 754-2008"), i.e., the decimal encoding or the binary encoding. The operands in internal format are referred to herein as decoded operands because the process of converting from memory format to internal format is interpreted as a decoding operation.

In one alternative embodiment, the memory format is identical to the internal format. Thus, no format conversion is necessary when reading or writing operands to memory.

This text refers to $SX_Y$, $CX_Y$ and $EX_Y$ as the sign, significand, and exponent of a DFP number, respectively. X is A, B or R to denote one of the two operands or the result. The subscript "Y" is a digit that denotes the output of different modules. A binary string $Q_i$ refers to the $i^{th}$ bit in Q, and $Q_{L,i}$ means the $i^{th}$ bit in the $L^{th}$ level of Q, where L is the level number in a binary tree. The notation [m,n] denotes a single signed decimal digit from m to n inclusive. The notation $(N)_i^j$ refers to the $j^{th}$ bit in digit position i in a decimal number N, where the least significant bit (LSB) and the least significant digit (LSD) have index 0. For example, $(CA_2)_2^3$ is bit three of digit two in the decimal significand $CA_2$. For a binary or decimal string, $U^k$ or $U^k \ldots U$ means a string of k U's.

In some embodiments, instead of using an IEEE 754-2008 format, which encodes the sign, significand, exponent, and miscellaneous information, including whether the number is infinity or Not-a-Number (NaN), into 64 bits for the decimal64 format, a decoded decimal number may be represented herein with an internal format that includes a LZC field. FIG. 1C shows the layout of the internal format 100 according to one set of embodiments. The internal format 100 may include a sign bit, an exponent field occupying $N_E$ bits, a significand occupying $N_S$ bits, special value flags occupying $N_F$ bits, and a leading zero count occupying $N_L$ bits. The leading zero count is the leading zero count of the significand. The exponent field may be uncompressed. The significand may remain un-normalized and may be encoded in BCD (binary coded decimal). The special value flags may include is-Infinity, is-Signaling NaN, is-Quiet NaN, and is-Zero. The use of this internal format may have the potential to reduce the latency of DFP addition and subtraction, as described further below.

In one embodiment, i.e., an embodiment corresponding to the IEEE Decimal64 Format, the internal format has $N_E=10$, $N_S=64$, $N_F=4$ and $N_L=4$. (See example 110 of FIG. 1.)

Figure 2:
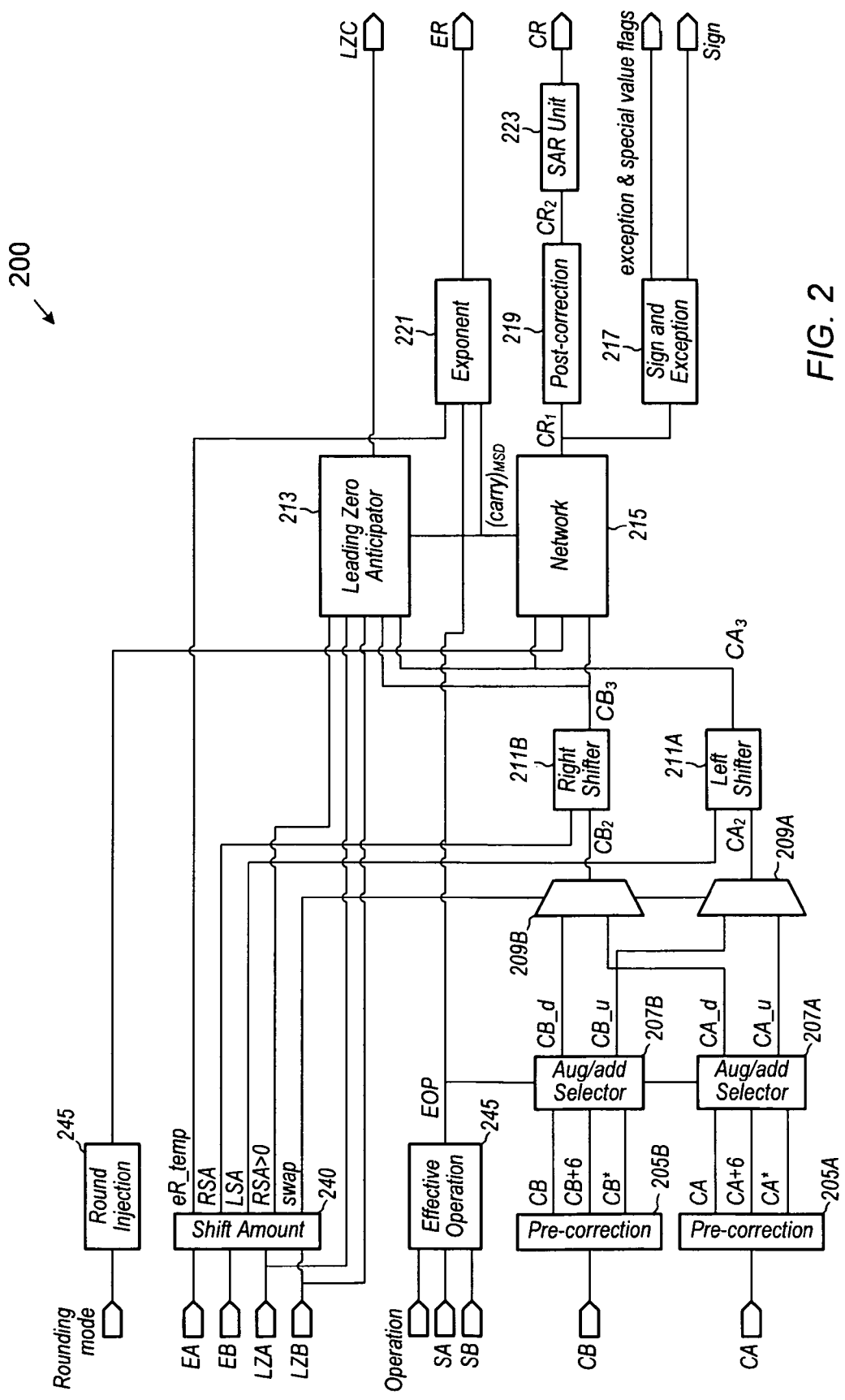
FIG. 2 illustrates one embodiment of a DFP adder 200.

FIG. 2 shows a block diagram of a decimal adder 200 according to one set of embodiments. The decimal adder is configured to perform addition or subtraction, depending on the value of the Operation signal. The decimal adder may operate on a first operand A and a second operand B. The first operand A may include a significand CA, a sign bit SA, an exponent EA and a leading zero count LZA. The second operand B may include a significand CB, a sign bit SB, an exponent EB and a leading zero count LZB.

The significands CA and CB may enter respective pre-correction units 205A and 205B, to generate $(CA)_i+6$, $(CB)_i+6$, $(CA)_i^*$ and $(CB)_i^*$, where $(CA)_i^*$ and $(CB)_i^*$ are the bit-inverted versions of each BCD digit in CA and CB. (The notation X* represents the bit-inversion of X. The notation $\overline{X}$ is used as an equivalent for X*.) Therefore, each digit in CA* (i.e., $(CA)_i^*$) is equal to $15-(CA)_i^*$. Simultaneously, the effective operation (EOP) may be determined and used to select the corrected significands.

$(CA\_u)_i$ represents the modified CA when it serves as the augend. $(CB\_u)_i$ represents the modified CB when it serves as the augend. $(CA\_d)_i$ represents the modified CA when it serves as the addend. $(CB\_d)_i$ represents the modified CB when it serves as the addend. When EOP specifies addition, $(CA\_u)_i$ and $(CB\_u)_i$ are $(CA)_i+6$ and $(CB)_i+6$, and $(CA\_d)_i$ and $(CB\_d)_i$ are $CA_i$ and $CB_i$. When EOP is subtraction, CA_u and CB_u are CA and CB, but CA_d and CB_d are CA* and CB*, respectively.

The effective operation unit 245 may determine EOP according to the Boolean expression EOP=$SA_1 \oplus SB_1 \oplus$Operation, where EOP and Operation are zero for addition and one for subtraction, and $\oplus$ denotes exclusive-OR.

While the significands are undergoing the correction, the shift amount unit 240 may determine the swap signal (swap), the left shift amount (LSA), the right shift amount (RSA) and the temporary exponent (eR_temp). The swap signal determines if significand swapping is to be performed. (In one embodiment, swap=1 is the state that indicates swapping, and swap=0 indicates no swapping.) Since the LZC of each input operands is provided, leading-zero detectors (LZDs) are not needed in the shift amount unit 240.

The swap signal from the shift amount unit 240 may determine the selections performed by multiplexers 209A and 209B. The outputs of multiplexers 209A and 209B are denoted $CA_2$ and $CB_2$, respectively. The left shifter 211A and right shifter 211B may align the operands $CA_2$ and $CB_2$ based on the shift amounts LSA and RSA, respectively. (In one embodiment, the left shifter and right shifter are decimal barrel shifters.) The digits that are shifted into the operands may be interpreted as corrected values. These corrected shifted-in values may be 4'b0110 and 4'b0000 for $CA_2$ in effective addition and subtraction, respectively; and 4'b0000 and 4'b1111 for $CB_2$ in effective addition and subtraction, respectively. (The notation 4'bXXXX denotes a 4-bit binary quantity.)

The aligned significands $CA_3$ and $CB_3$ may be supplied to the LZA 213 to generate the LZC of the result. The aligned significands may also be supplied to the network 215, which generates the carry, uncorrected sum (UCR), and two sets of flags. (The network 215 may include a modified or augmented Kogge-Stone network.) These signals from network 215 may be supplied to the sign and exception unit 217 to determine the sign, the exception flags, and special values. In addition, these signals are provided to the post-correction unit 219. The post-correction unit 219 may converts the uncorrected sum $CR_1$ to a BCD-encoded significand $CR_2$. The temporary exponent (eR_temp), the effective operation EOP and the carry-out of the MSD (carry$_{MSD}$) may enter the exponent unit 221 to generate the final exponent value ER. The output from the post-correction unit 219 may be supplied to the shift and round unit 223, where it is conditionally incremented based on the prevailing rounding mode, the carry vector, and the flag vectors. The SAR unit 223 may use decimal injection-based rounding.

For more information on the Kogge-Stone parallel prefix network, please refer to "A Parallel Algorithm for the Efficient Solution of a General Class of Recurrence Equations", P. M. Kogge and H. S. Stone, IEEE Trans. Computers, vol. C-22, no. 8, pp. 786-793, August 1973.

Shift Amount Calculation

The shift amount unit 240 may determine data including the temporary exponent eR_temp, the right shift amount RSA, the left shift amount LSA, the (RSA>0) signal and the swap signal based on exponents EA and EB and leading zero counts LZA and LZB. The swap signal may be determined by the expression swap=(EB>EA), i.e., swap=1 if EB is greater than EA. The number of leading zeros in the operand (A or B) with the larger exponent is denoted as $LA_S$.

Decimal operand alignment is complicated since decimal numbers are not necessarily normalized. This implies that both left and right shifts may be required to arrange for the rounding location to be in a fixed digit position. To adjust both operands to have the same exponent, in one set of embodiments, the following computations may be performed by the shift amount unit 240:

RSA=min{p+3, max(|EA−EB|−$LA_S$, 0)},

LSA=min(|EA−EB|, $LA_S$), $EA_S$=max{EA,EB} eR_temp=$EA_S$−LSA.

The parameter p denotes the precision of the DFP format. These computations produce a left shift amount LSA. The LSA is the number of digits that $CA_2$ is to be left shifted. LSA may be set equal to the absolute value of the exponent difference |EA−EB|. LSA may be limited to at most LAS digits so that the left-shifted significand $CA_3$ has more than p digits. (In the decimal64 format, p=16). RSA is the number of digits that $CB_2$ is to be right shifted in order to achieve the condition that both numbers have the same exponent eR_temp after operand alignment. RSA is zero if $LA_S$ is sufficiently large to accommodate the difference of the exponents. RSA may also be limited to a maximum of p+3 digits, since the right-shifted significand $CB_3$ contains p digits plus guard, round, and sticky digits.

The shift amount unit 240 may include an end around carry (EAC) adder to compute swap=sign (EA−EB) and |EA−EB|.

(For information on an end around carry adder design, please refer to N. Burgess, "Prenormalization Rounding in IEEE Floating-Point Operations Using a Flagged Prefix Adder," IEEE Trans. VLSI Systems, vol. 13, no. 2, pp. 266-277, February 2005.) If swap equals one, then $EA_S$=EB and $LA_S$=LB. Conversely, if swap equals zero, $EA_S$=EA and $LA_S$=LA. $LA_S$ may be subtracted from |EA−EB| to compute RSA and the select signal. The select signal may be computed according to the expression: select=sign(|EA−EB|−$LA_S$). The select signal may be used to select the value for LSA and to ensure that RSA is greater than zero.

Figure 3:
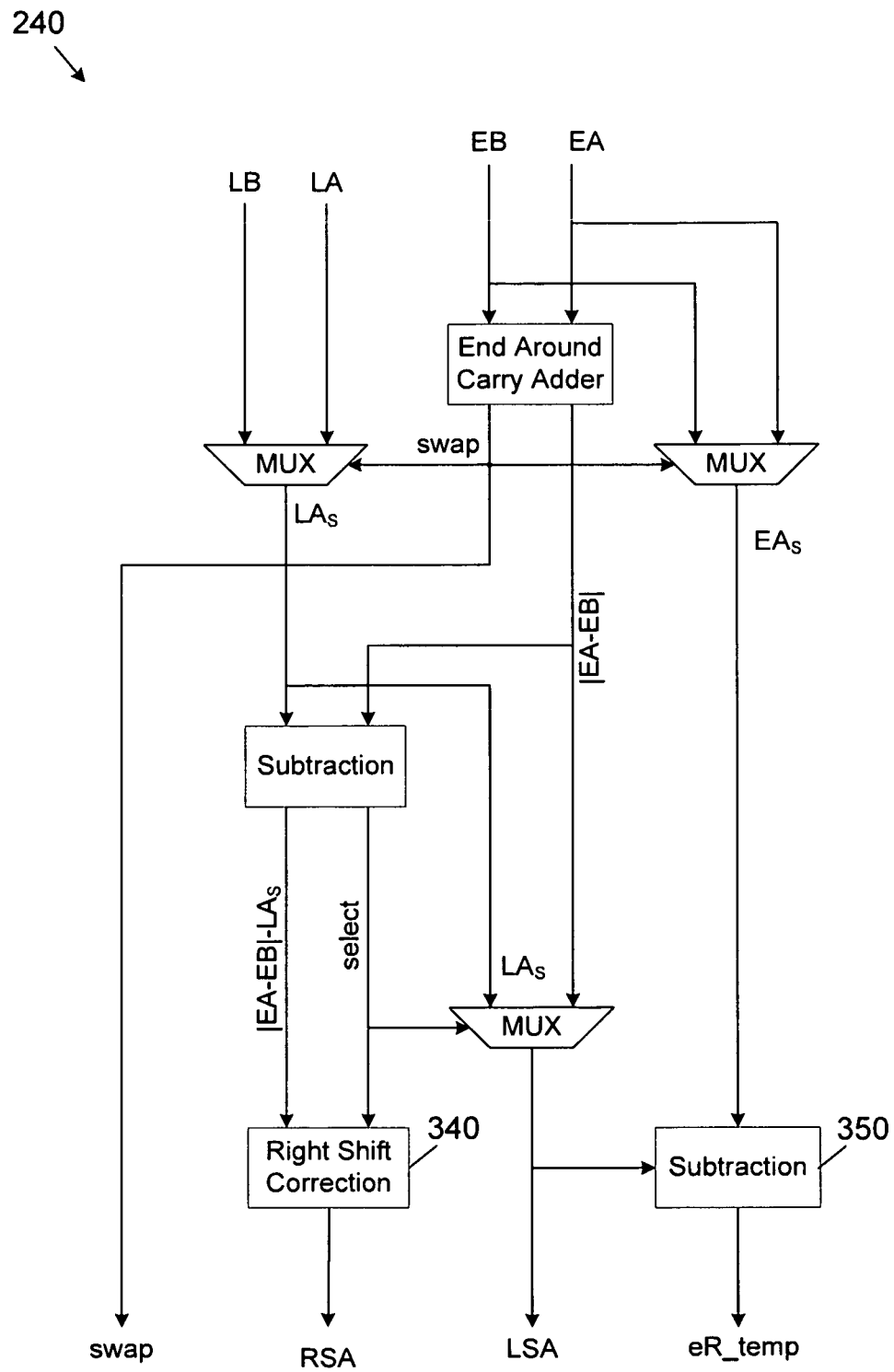
FIG. 3 illustrates one embodiment of a shift amount unit 240.

As indicated in FIG. 3, the right-shift correction unit 340 may limit RSA to a value between 0 and p+3, and in parallel, subtraction unit 350 may compute eR_temp according to the expression: eR_temp=$EA_S$−LSA.

Operand Alignment

Figure 4:
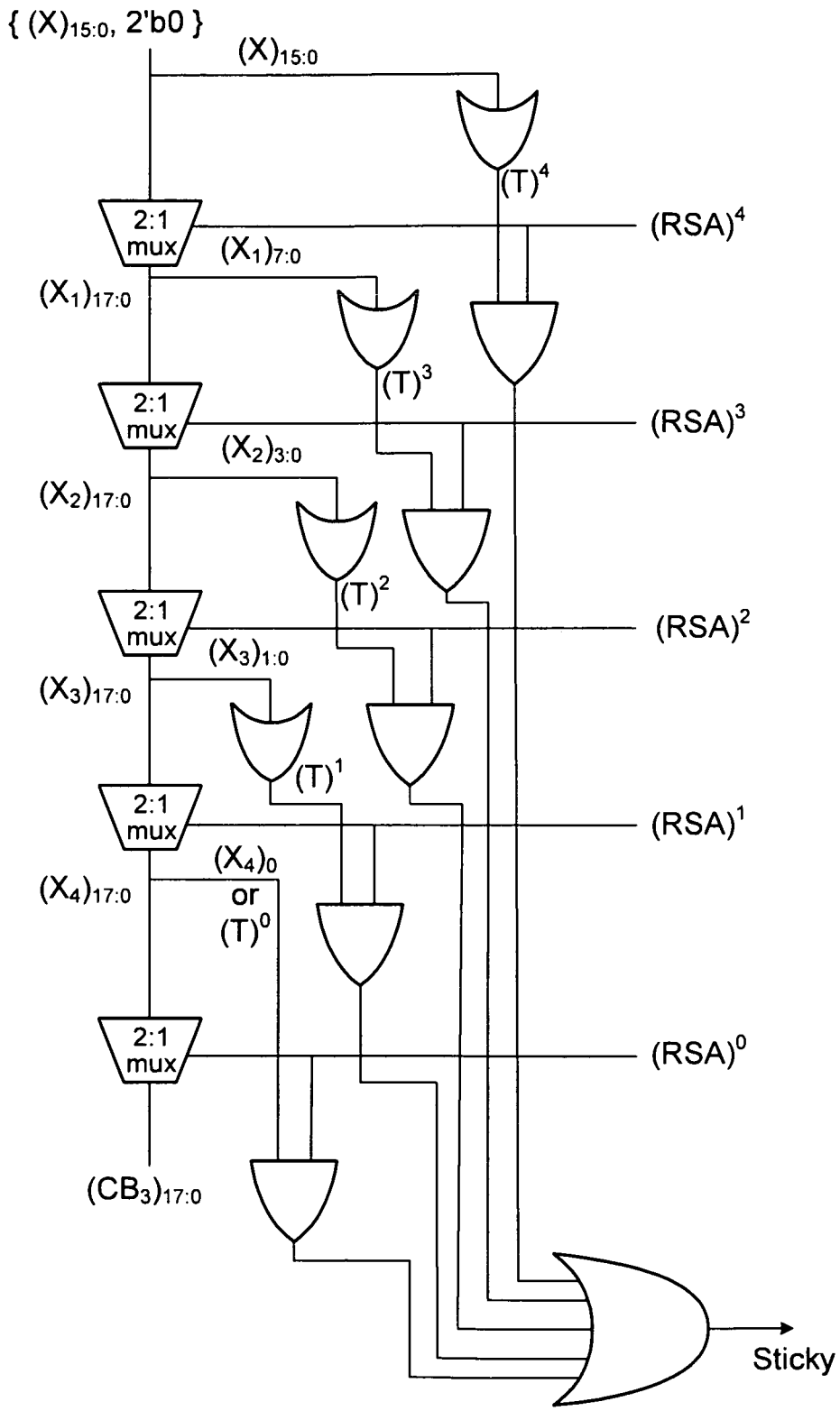
FIG. 4 illustrates one embodiment of a circuit that performs barrel shifting and sticky bit generation.

After computing the left shift amount LSA and the right shift amount RSA, the decimal barrel shifters 211A and 211B may perform the operand alignment. (The decimal barrel shifters may be configured to shift by multiples of four bits.) The significands after alignment are denoted as $CA_3$=ShiftLeft($CA_2$,LSA) and $CB_3$=ShiftRight($CB_2$,RSA). In one set of embodiments, $CA_3$ may be 16 digits, and $CB_3$ may be 16 digits plus a guard digit G, a round digit R, and a sticky digit S. FIG. 4 is a circuit diagram for shifting X=$CB_2$ and for generating a sticky bit from RSA and $CB_2$. The sticky bit may be subsequently expanded into a sticky digit in the "operand placement unit", to allow all the digits in $CB_3$ to be processed using the same (or similar) technique and to simplify downstream processing.

In FIG. 4, a sequence of multiplexer units may right shift X=$CB_2$ based on the bits of RSA. Each bit of RSA may control a correspond one of the multiplexer units. In parallel with the shifting action, bits from $CB_2$ or shifted versions of $CB_2$ from the multiplexer outputs may be combined via "OR" operations to generate bits $(T)^{4:0}$. The bits of RSA, $(RSA)^i$, may be used as mask bits: $(RSA)^i$ controls whether $(T)^i$ contributes to the sticky bit. The outputs $(T)^i$ AND $(RSA)^i$ generated by the respective AND gates may be ORed to form the sticky bit. Although FIG. 4 shows one embodiment of a circuit for generating the sticky bit, various alternative embodiments are contemplated. For example, in one embodiment, 4-to-1 multiplexers may be used as an alternative to 2-to-1 multiplexers, e.g., to decrease delay. In DFP arithmetic according to IEEE 754-2008, it is possible to have a zero operand that has an exponent that is greater than the exponent of a nonzero operand. In this case, neither operand is shifted for DFP addition and subtraction.

After shifting, a value that is determined by a prevailing rounding mode and a sign bit may be injected into the R and S digit positions of $CA_3$ to obtain $CA_3$'. The value $CA_3$' may be a 19-digit pre-corrected decimal number (see FIG. 5). FIG. 6 presents an injection value table that shows the dependency of the injection value on the sign bit and the rounding mode, according to one embodiment. The injection value may be determined by equations similar to those developed for BFP addition and may be used to facilitate correct rounding. (For information on BFP addition, please refer to P. M. Seidel and G. Even, "Delay-Optimized Implementation of IEEE Floating-Point Addition," IEEE Trans. Computers, vol. 53, no. 2, pp. 97-113, February 2004.) The injection values may be chosen so that the action of including the injection value as part of the addition or subtraction allows a rounding operation to be effectively replaced by a truncation operation. For example, supposing that roundAwayZero is the rounding mode, the injection value (R,S)=(9,9) may be used. Thus, a carry is generated into the G digit position, unless both the R and S digits of $CB_3$ are zero. To perform correct rounding in the roundTiesToEven rounding mode, in some embodiments, the LSB of the result may be set to zero (in the SAR unit 223) when the result is halfway between two representable DFP numbers, i.e., when RS=00 after the final addition.

In the injection value table (FIG. 6), roundAwayZero and roundTiesToZero are rounding modes used in the BigDecimal class of Java. The others rounding modes are required by IEEE 754-2008. $Sign_{inj}$ is the temporary sign of the result. In some embodiments, the temporary sign $Sign_{inj}$ assumes the result after network 215 is positive when rounding is performed. This assumption is correct for the following reason. If the result from network 215 is negative, LSA could be nonzero but RSA is always zero, at least in some embodiments. Therefore, rounding is not needed. $Sign_{inj}$ may be computed according to the expression given in FIG. 7. In some of the rounding modes, the injection value does not depend on $Sign_{inj}$ this lack of dependency is denoted using "?" in the injection value table.

The modified $CA_3$ and $CB_3$ may be placed in different digit positions, based on the effective operation (EOP), before being supplied to network 215. As shown in FIG. 5, in the case of subtraction, both operands may be placed starting from the MSD. However, in the case of addition, both operands may be placed starting from one digit to the right of the MSD. (MSD means "most significant digit".) This placement scheme permits the 16-digit final result to be selected from the 17 most significant digits, and may allow the injection correction value to be placed in the same locations in both effective addition and subtraction. $CA_3$' and $CB_3$' denote the operands after placement; both may be 19 digits. In some embodiments, the injection value may be injected on all operations related to addition or subtraction, except when the effective operation is subtraction and no right shift is performed on $CB_3$. In this exceptional condition, since rounding does not occur and the result from the network 215 may be negative, inserting the injection value might require more complex logic in the post-correction unit. To avoid this extra complexity, another signal, "flush", may be generated to clear the injection value. The flush signal may be computed according to the expression: flush=(RSA≡0)^ EOP.

Network 215

In some embodiments, network 215 may include a binary K-S network and a network for trailing nines detection. The binary K-S network may be used to generate carries into each digit. In addition to the set of flag bits ($F_1$) used in the post-correction unit 219, another set of flag bits $F_2$ may be generated and used in the shift and round (SAR) unit 223. The $F_2$ flag bits may be used to avoid another carry-propagate addition when the MSD of $CR_2$ is nonzero. For example with p=7, if $CA_3$=0_9999999_99, $CB_3$=0_0039999_91, and decimal addition with roundTowardPositive is performed, then $CR_2$ becomes 1_0039999_90 and has an MSD of 1. Observe that the result has three consecutive "nines" starting from the LSD. The two rightmost nines are discarded when p=7. Therefore, the four LSDs are incremented and the final result becomes $1,004,000\times10^1$ after shifting and rounding. A method known as "trailing-nine detection" may be used to determining which digits need to be incremented. In some embodiments, trailing-nine detection may be used only if EOP is addition or EOP is subtraction and $CA_3$-$CB_3$ is positive. If $CA_3$-$CB_3$ is negative, there is no need to perform rounding and trailing-nine detection, at least in some embodiments.

Figure 8:
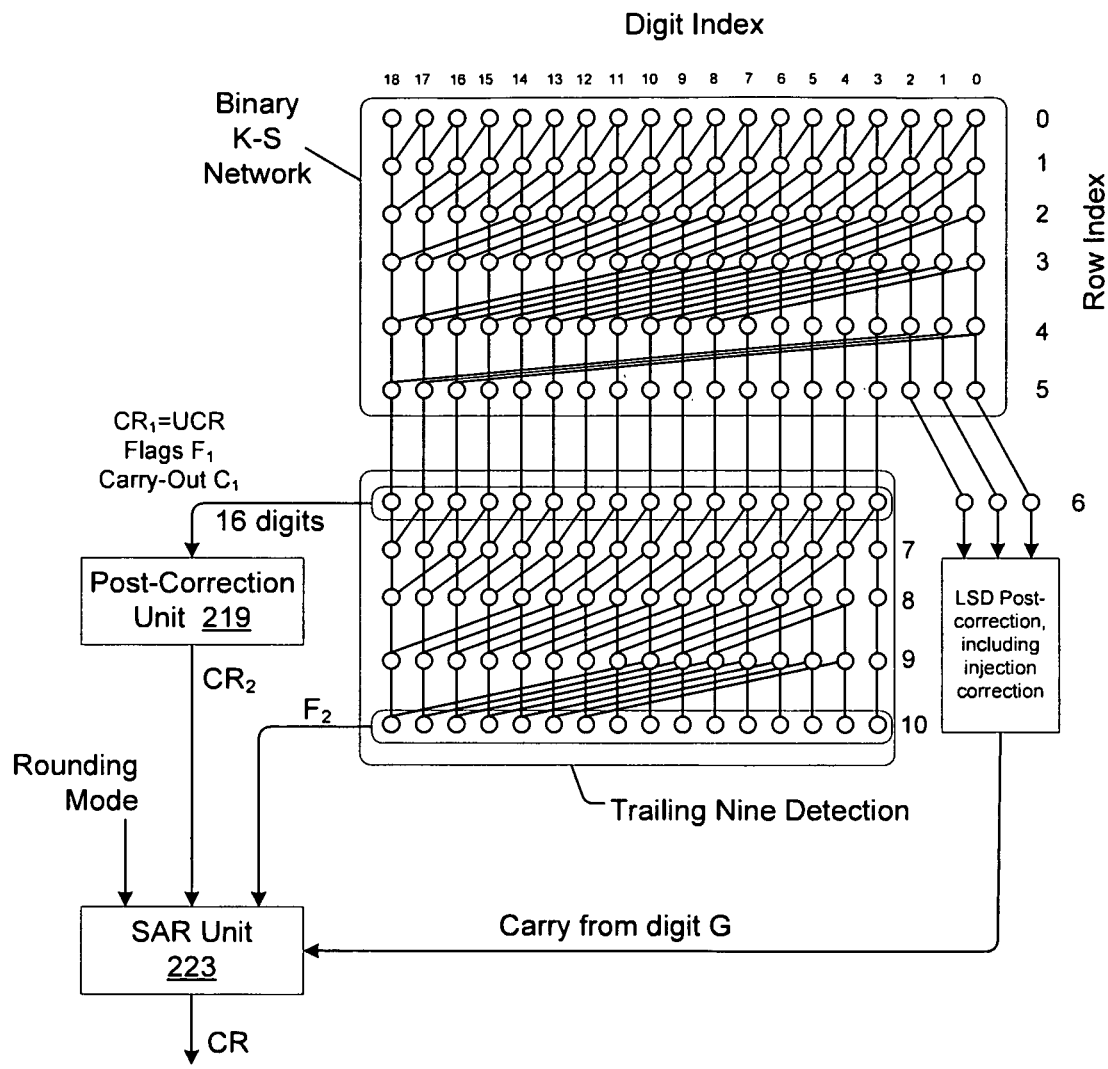
FIG. 8 illustrates one embodiment of network 215, including a Kogge-Stone network and flag logic.

FIG. 8 illustrates one embodiment of network 215. Network 215 may include a binary K-S network and a network to detect trailing nines. The traditional binary injection-based rounding method uses a compound adder to compute the uncorrected sum and the uncorrected sum plus one, and then uses the MSDs of these values and the carry into the LSD of the uncorrected sum to select the proper sum. To decrease circuit area, network 215 instead uses a decimal variation of the flagged-prefix method to compute the uncorrected sum (UCR) and the uncorrected sum plus one. (For more information on the flagged-prefix method, please refer to "Prenormalization Rounding in IEEE Floating-Point Operations Using a Flagged Prefix Adder", N. Burgess, IEEE Trans. VLSI Systems, vol. 13, no. 2, pp. 266-277, February 2005.) Since the value generated in the binary K-S network is not in the BCD encoding, the bits of $F_2$ are generated by observing both the uncorrected sum digits (UCR)$_i$ and the carry-out bits $(C_1)_{i+1}$ of the 16 MSDs.

$F_1$ is a flag vector that indicates the end of a continuous string of ones starting from the LSB. This flag may be used in the postcorrection unit 219. To generate the $F_2$ flag vector for trailing-nine detection, UCR may be examined for trailing $F_S$, or alternatively, $CR_2$ may be examined for trailing nines starting from the LSD. The embodiment shown in FIG. 8 computes the $F_2$ flag vector based on UCR. The UCR-based approach may use two sets of flags, flagADD and flagSUB, for addition and subtraction, respectively.

The trailing-nine detection network may operate in parallel (or, partially in parallel) with the postcorrection unit 219. Row 6 may operate according to the equations given in FIG. 9. $(C_1)_{i+1}$ is the carry-out bit of digit position i, and $P_3$ is the block propagate of the G, R and S positions shown in FIG. 5. Each of rows 7-10 may operate according to the equations given in FIG. 10.

Postcorrection Unit and SAR Unit

The postcorrection unit 219 may convert the uncorrected result UCR from the binary K-S network to BCD, thereby producing $CR_2$. The postcorrection unit may operate according to the following rules. Rule 1, which is applied when performing effective addition, includes adding "1010" (i.e., a correction of −6) to (UCR)$_i$ when $(C_1)_{i+1}$ is 0. Rule 2, which is applied when performing effective subtraction, is specified by the pseudo code in FIG. 11.

Rule 1 means that the precorrection value is simply subtracted from each sum digit where no carry-out is generated from that digit position.

For Rule 2, if the result is positive, UCR may be incremented by one since a nine's complement was performed on CB in the precorrection unit 205B. UCR may be incremented by inverting the bits in UCR for which the corresponding bit in $F_1$ is one. Since $F_1$ is generated in the binary K-S network, this action may be easily performed using a row of parallel exclusive-OR (XOR) gates. Next, if the most significant flag bit $(F_1)_i^3$ and the carry-out $(C_1)_{i+1}$ of digit position i are the same, then $(CA_3)_i < (CB_3)_i$. Thus, a value of six is subtracted from the sum digit, which is equivalent to adding a value of 10 to the digit position. Similarly, if the result is negative, all sum bits may be inverted so that $CR_2 = CB_3 - CA_3$. Next, if $(C_1)_{i+1}$ is one, it implies $(CB_3)_i < (CA_3)_i$. Hence, a value six is subtracted from, or equivalently 10 is added to, the sum digit at position i.

The shift and round unit (SAR) 223 may compute the significand CR of the final result based on the sign of the result and the rounding mode. If the MSD of $CR_2$ is zero, the SAR unit 223 may truncate the corrected result $CR_2$ from the postcorrection unit 219 to obtain the final result significand CR. Conversely, if the MSD of $CR_2$ is nonzero, the SAR unit 223 may add an injection correction value to $CR_2$ to adjust the initial injection value, e.g., similar to the approach used by the injection-based method in binary arithmetic. This is because the injection value injected in the operand placement unit is off by one digit if the MSD of $CR_2$ is nonzero. Under this condition, a second correction value may be added to $CR_2$, e.g., a correction value as shown in the table of FIG. 12. Adding the injection correction value from this "correction table" to the injection value from the injection value table (FIG. 6) gives the overall injection value required when the MSD of $CR_2$ is nonzero.

As illustrated in the correction table, there are only two distinct nonzero injection correction values. S is always zero for injection correction. Similar to the injection value table, some injection correction values do not depend on Sign$_{inj}$. This lack of dependency is denoted with the symbol "?". In some embodiments, injection correction values are needed only if the MSD of $CR_2$ is nonzero, and thus, it is not possible to have another carry-out of the MSD due to adding injection correction values.

The $F_2$ flag vector is generated in the trailing nine detection network. The flag vector $F_2$ may be used to conditionally increment $CR_2$ via a row of parallel exclusive-OR gates.

Sign and Exception Unit

The sign and exception unit 217 may compute the sign of the final result and handle exception conditions such as overflow. Overflow occurs when the addition or subtraction of two operands exceeds MAXFLOAT. (MAXFLOAT is the maximum representable DFP number in the destination format.) Typically, the adder needs to check the carry-out of the MSD after rounding the corrected result to determine if an overflow occurs. However, with the injection-based rounding method, because the injection correction value does not generate another carry from the MSD, the overflow signal may be generated by examining the result exponent eR_temp and the MSD of $CR_2$. Unit 217 may also generate a signal to determine if the final result should be ±∞ or ±MAXFLOAT based on the sign of the result and the prevailing rounding mode.

The sign bit of the result (Sign) is determined by several factors. The following equation shows the normal case when no special cases or exceptions occur:

Sign=(EOP*~SA)v(EOP^(swap*XOR SA XOR$(C_1)_{16}$)
).

Since the sign bit is used in the overflow determination and in the SAR unit, it may be beneficial to determine its value soon as possible, at least in some embodiments. To compute the sign of the result quickly, the equations for the special cases may be duplicated, with one set of equations being specialized under the assumption that the MSD of the carry vector $C_1$ (i.e., $(C_1)_{16}$) from the K-S network is zero and the other set under the assumption that it is one. When $(C_1)_{16}$ from the K-S network is available, it may be used to quickly select the correct sign bit. This approach is similar to one used in the design of carry-select adders.

Decimal Leading-Zero Anticipator

Figure 13:
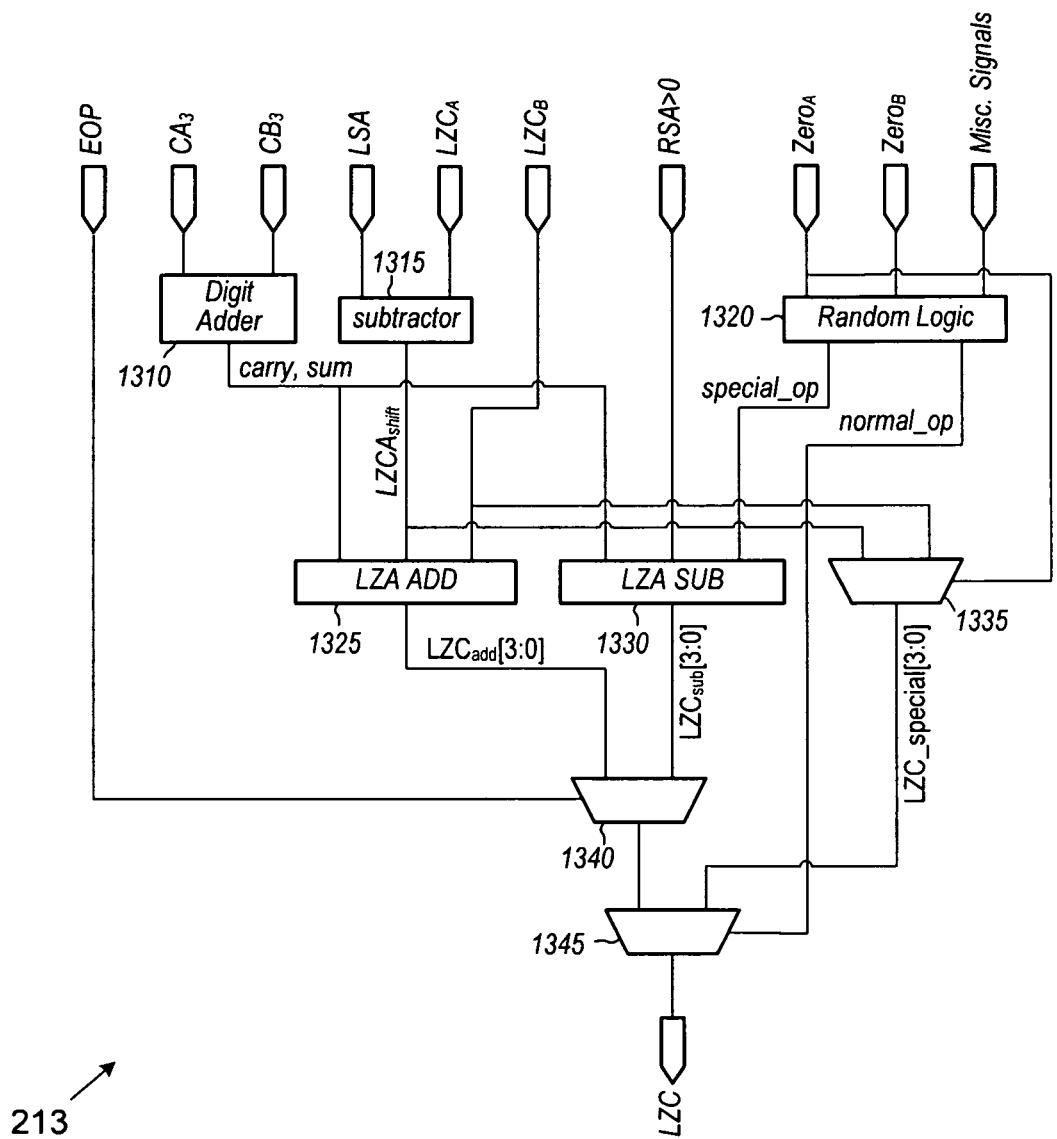
FIG. 13 illustrates one embodiment of LZA 213.

As shown in FIG. 13, the LZA 213 includes a digit adder 1310, a subtractor 1315, logic 1320, an effective addition LZA 1325, an effective subtraction LZA 1330, a multiplexer 1335, a multiplexer 1340 and a multiplexer 1345. The effective addition LZA 1325 may be configured to determine the LZC for the final result under the assumption that EOP is addition. The effective subtraction LZA 1330 may be configured to determine the LZC for the final result under the assumption that EOP is subtraction. LZAs 1325 and 1330 may operate in parallel. Multiplexer 1340 selects one of the two LZCs based on the EOP signal. The digit adder 1310 may include a parallel array of decimal digit adders.

Leading zero anticipation is performed in both effective addition and subtraction. However, it is worthwhile to note that LZA is only needed when the result after the decimal addition or subtraction is not rounded because the LZC is always zero when the result is rounded.

LZA 1325 for Effective Addition

Unlike in binary floating-point arithmetic, in IEEE 754-2008, DFP numbers are not normalized. Therefore, the LZA 213 also predicts the number of leading zero digits in effective addition. The number of leading zeros in the result is generally equal to the LZC of $CA_3$ or the LZC of $CB_3$, whichever is less. Thus, the preliminary LZC, denoted as $PLZC_{add}$, is defined as $\min(LZC(CA_3), LZC(CB_3))$. The only time correction is needed is when there is a carry-out from the leading nonzero digit of the input operand that has a smaller LZC. In this case, the final LZC is obtained by decrementing $PLZC_{add}$ by one. For example, 0009998+0000002 has a carry-out from the fourth most significant digit. In some embodiments, the need for correction is indicated by the pattern $0^x pm^y gm?^z$, where x>0 and y>0; and pm and gm are the digit propagate and digit generate signals, respectively, and "?" indicates a "don't care" condition for a given digit. The expression "$?^k$" denotes k successive "don't care" digits.

This pattern can be detected using the following steps. First, note $(CA_3)_i$ and $(CB_3)_i$ are the operand digits after pre-correction, so $(CA_3)_i$ is equal to $(CA)_i + 6$ and $(CB_3)_i$ is still $(CB)_i$ when the effective operation is addition. Also, pm, gm and zm bits are generated for each digit, where pm is the digit propagate and is equal to $((CA_3)_i + (CB_3)_i \equiv 15)$; gm is the digit generate signal and is equal to $((CA_3)_i + (CB_3)_i \geq 15)$; and zm indicates if the result digit is zero and is equal to $((CA_3)_i + (CB_3)_i \equiv 6)$. These vectors may be used to generate the final correction signal $Y_{add}$, which is 1 when correction should be performed, based on the equations given in FIG. 14A. Note $\wedge$ and $\vee$ denote logical-AND and logical-OR, respectively.

Figure 14B:
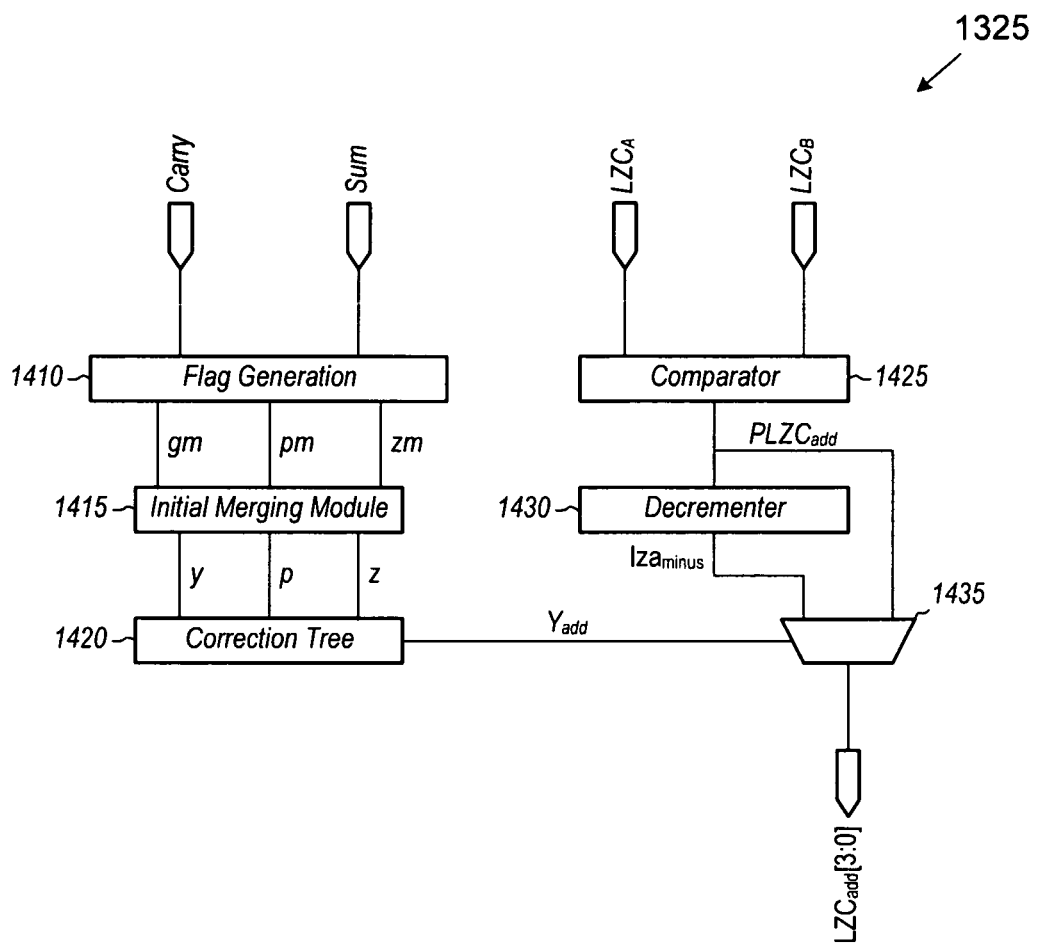
FIG. 14B illustrates one embodiment of addition LZA 1325.

FIG. 14B is a block diagram of the LZA 1325 for effective addition, according to one set of embodiments. The LZA 1325 includes a flag generation module 1410, an initial merging module 1415, a correction tree 1420, a comparator 1425, a decrementer 1430 and a multiplexer 1435. In one embodiment, LZA 1325 is configured to operate on 16-digit operands.

The flag generation module 1410 may operate on the carry and sum operands to generate the gm, pm and zm signals. Those signals may be supplied to the initial merging module 1415. The initial merging module 1415 may operate on the gm, pm and zm signals to generate the vector signals y, p and z, which are supplied to the correction tree 1420. The correction tree 1420 operates on the vector signals y, p and z to generate the signal $Y_{add}$.

The comparator 1425 may receive $LZC_A$ and $LZC_B$ and select the smaller of those two operands to be $PLZC_{add}$. $PLZC_{add}$ may be supplied to decrementer 1430 and multiplexer 1435. The decrementer 1430 is used to produce the result $1za_{minus}$. (In one embodiment, the comparator 1425 is a 4-bit comparator, and the decrementer 1430 is a 4-bit decrementer.)

The final multiplexer 1435 may be configured to select one of $PLZC_{add}$ and $1za_{minus}$ based on the signal $Y_{add}$. The selected value is the correct LZC value for effective addition, denoted $LZC_{add}$.

LZA for Effective Subtraction

Figure 15:
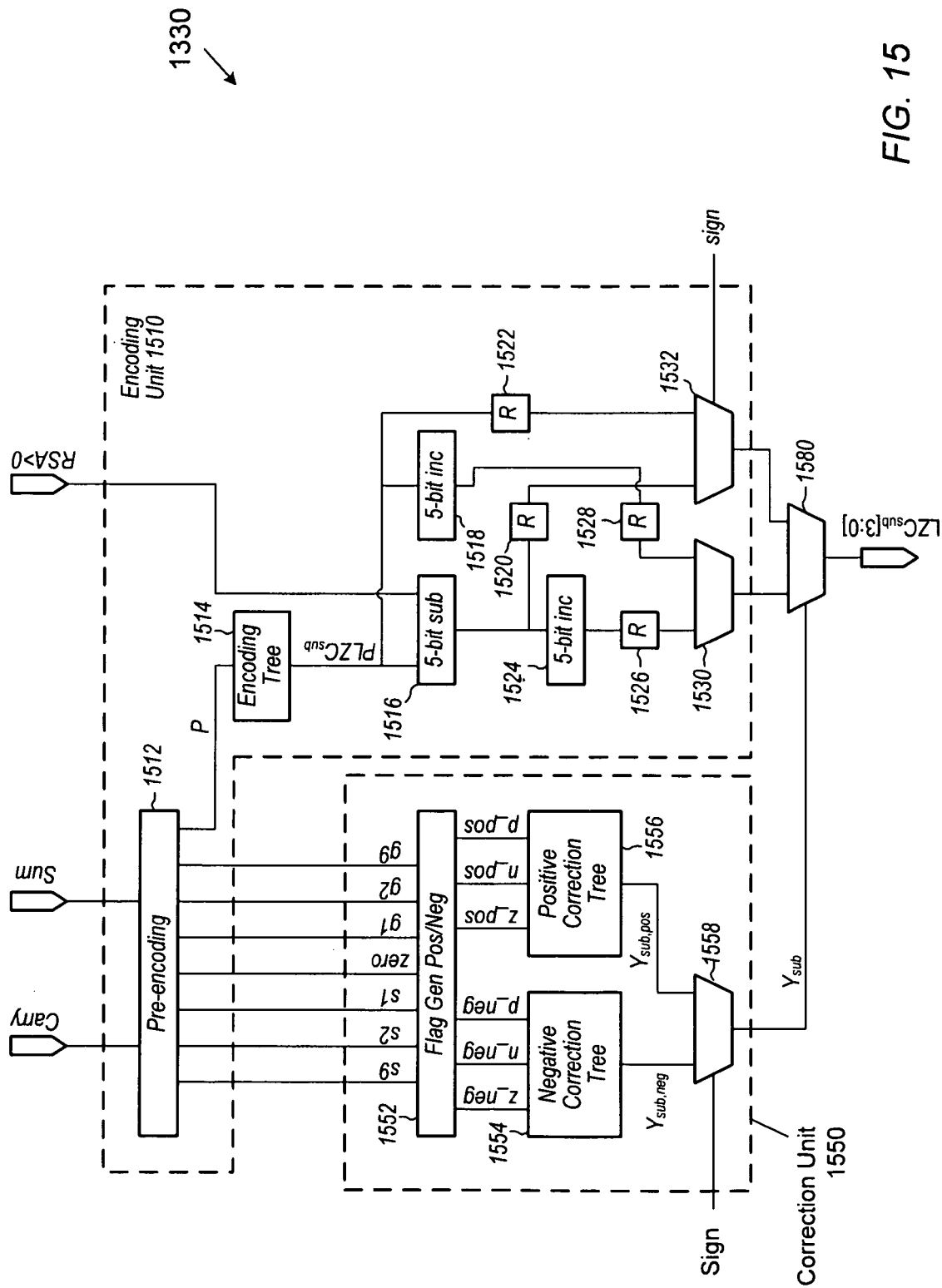
FIG. 15 illustrates one embodiment of subtraction LZA 1330.

In one set of embodiments, the subtraction LZA 1330 may include an encoding unit 1510, a correction unit 1550 and an output multiplexer 1580, e.g., as illustrated in FIG. 15.

Decimal subtraction of unnormalized positive operands A and B produces a result $Z=0^j[-9,9]^k$, where the most significant digit in the $[-9,9]^k$ string is non-zero.

The encoding unit may include a pre-encoding module 1512, an encoding tree 1514, a subtractor 1516, an incrementer 1518, an R-box 1520, an R-box 1522, an incrementer 1524, an R-box 1526, an R-box 1528, a multiplexer 1530 and a multiplexer 1532.

The pre-encoding module 1512 converts BCD digits into strings of zeros and ones. The encoding tree 1514 detects the position of the most significant non-zero digit in the string from the pre-encoding module. The leading zero count from the encoding tree 1514 is denoted as the preliminary LZC ($PLZC_{sub}$).

In some embodiments, the correction unit 1550 includes a pair of flag generation modules and correction trees to detect if a correction step is necessary on the $PLZC_{sub}$ value from the encoding tree 1514. Details for each unit and module are given below. The correction unit generates the correction signal $Y_{sub}$.

Decimal Digit Adder: A decimal digit addition of the aligned and corrected significands, $CA_3$ and $CB_3$, is performed according to the expression:

$$(W)_i = (CA)_i - (CB)_i \rightarrow (CA_3)_i + (CB_3)_i = ((carry)_i, (sum)_i)$$

In effective subtraction, $(CA_3)_i = (CA)_i$ and $(CB_3)_i = (15 - (CB)_i)$, $(W)_i$ is the 5-bit result using the manual subtraction algorithm, while $((carry)_i, (sum)_i)$ is the 5-bit result of $(CA_3)_i + (CB_3)_i$. The result $((carry)_i, (sum)_i)$ from each decimal digit adder is shared by the addition LZA and the subtraction LZA.

Encoding Unit 1510: The pre-encoding module 1512 may convert the (carry,sum) representation of W into strings of 0's and 1's. Each digit $(W)_i$ may be examined to determine if it is $-9$, $[-9,-2]$, $-1$, $0$, $1$, $[2,9]$, or $9$, which are represented by the symbols $s9_i$, $s2_i$, $s1_i$, $zero_i$, $g1_i$, $g2_i$, $g9_i$, respectively. These bit vectors may be used to determine the leading zero count. FIG. 16 shows a table that describes the relationship between these symbols and the states of $(W)_i$. This "symbol definition table" also shows the $((carry)_i, (sum)_i)$ pair that corresponds to each $(W)_i$ state.

Since this LZA is only needed in effective subtraction, in which $4'b0000 \leq (CA_3)_i \leq 4'b1001$ and $4'b0110 \leq (CB_3)_i \leq 4'b1111$, logic for the symbols in the symbol definition table can be further optimized in the hardware implementation by collapsing the unused values. Also, although it is possible to generate these signals directly from $(CA_3)_i$ and $(CB_3)_i$, in some embodiments, doing so may create too much output load for the circuits that generate $(CA_3)_i$ and $(CB_3)_i$ and affect the timing on the path through the network 215.

The positive and negative strings of W may be analyzed separately. For positive W, the table in FIG. 17 shows the digit pattern of W, the number of leading zeros, the substring patterns, and the Boolean equation of the substring patterns to detect the leading one in a decimal string. For example, a W string (000345678) matches the row $(0^k[2,9][-9,9]^m)$, and (001(−9)(−9)(−5)456) matches the row $(0^k 1(-9)^j[-8,-1][-9,9]^m)$.

Some bit patterns that generate incorrect results (i.e., off by one) are corrected later using the correction unit 1550. Additionally, the W string may be converted to a binary string P(W) to determine the leading non-zero digit in W, where each bit $P_i(W)$ in P(W) is represented by $$P_i(W) = g2_i \vee (g1_i \vee s9_i)\wedge(s9_{i-1}*),$$

where "v" denotes the logical-OR operator, and "^" denotes the logical-AND operator.

Similarly, for a negative W (denoted as W*, or equivalently, as $\overline{W}$), a different set of patterns is used, as shown in the table of FIG. 18. The W* string is converted to a binary P(W*) string, where each bit $P_i(W^*)$ is given by the expression $$P_i(W^*)=s2_i\,v(s1_i\,v\,g9_i)\hat{\ }(g9_{i-1}^*).$$

It is possible to merge these two strings so that only one leading zero detector (LZD) is used. In the case of W>0, if the number of leading zeros is k or k+1, the digit prior to the most significant non-zero digit is always zero, whereas if the number of leading zeros is k+j or k+j+1, the digit prior to the least significant (−9) is either 1 or −9 (i.e., not zero.) It is similar in the W<0 case. As a result, P(W) and P(W*) can be combined into a new string P, where $P_i$ is determined by the expression given in FIG. 19. An LZD is used to determine the number of leading zeros in string P. The result generated by the LZD is referred to as the preliminary leading zero count $PLZC_{sub}$. The preliminary LZC is subject to correction, as described below.

The location of the leading one in string P can be determined in any of various ways. For example, in one embodiment, the leading one determination may be performed using a priority encoder (e.g., a 17-bit priority encoder) similar to the design by Hokenek and Montoye given in "Leading-zero anticipator (LZA) in the IBM RISC System/6000 Floating-point execution unit", IBM Journal of Research and Development, 34(1):71.77, 1990. In another embodiment, the leading one determination may be performed using a technique developed by Oklobdzija in "An algorithmic and novel design of a leading zero detector circuit: Comparison with logic synthesis", IEEE Transactions on Very Large Scale Integration (VLSI) Systems, 2:124.128, March 1994.

A behavioral RTL description of the priority encoder may be used to implement the encoding tree 1510.

Correction Unit 1550: From the tables in FIGS. 17 and 18, a correction step may be performed for W>0 when any of the following patterns occurs:

$0^k10^r[-9,9]^m$ or $0^k1(-9)^j0^r[-9,-1][-9,9]^m$ or
$0^k1[-8,-1][-9,9]^m$ or $0^k1(-9)^j[-8,-1][-9,9]^m$.

These patterns can be consolidated into two general patterns: $0^{k+j}10^r[-9,-1][-9,9]^m$ and $0^{k+j}[-8,-1][-9,9]^m$. To facilitate the detection of these patterns, the flag generation unit 1552 generates the three vectors: p_pos, n_pos and z_pos. The vector p_pos$_i$ indicates the occurrence of a leading one; the vector n_pos$_i$ indicates the occurrence of a terminate signal (i.e., 0(−9) or [−8,−1]), and the vector z_pos$_i$ denotes a digit that is zero. In one embodiment, these vectors may be determined by the equations shown in FIG. 20.

Once these three vectors are computed, the correction tree 1556 may be used to determine whether correction is needed. Four variables, Tz, Tp, Tn and Ty, are tracked in the correction tree 1556. Each node of the correction tree may operate according to the equations shown in FIG. 21, where $(Tz_{0,i}, Tp_{0,i}, Tn_{0,i})=(z\_pos_i, p\_pos_i, n\_pos_i)$, $Ty_{0,i}=0$, and $Y_{sub,pos}=Ty_{4,0}$.

Similarly, for negative W, a correction step may be performed if any of the following patterns is detected:

$0^k(-1)0^r[1,9][-9,9]^m$ or $0^k(-1)9^j0^r[1,9][-9,9]^m$ or
$0^k(-1)[1,8][-9,9]^m$ or $0^k(-1)9^j[1,8][-9,9]^m$.

These four patterns can be consolidated into two patterns, $0^{k+j}(-1)0^r[1,9][-9,9]^m$ and $0^{k+j}(-1)[1,8][-9,9]^m$. To facilitate detection of the these patterns, the flag generation unit 1552 may generate vectors p_neg, n_neg and z_neg, e.g., as determined by the equations given in FIG. 22.

Figure 23:
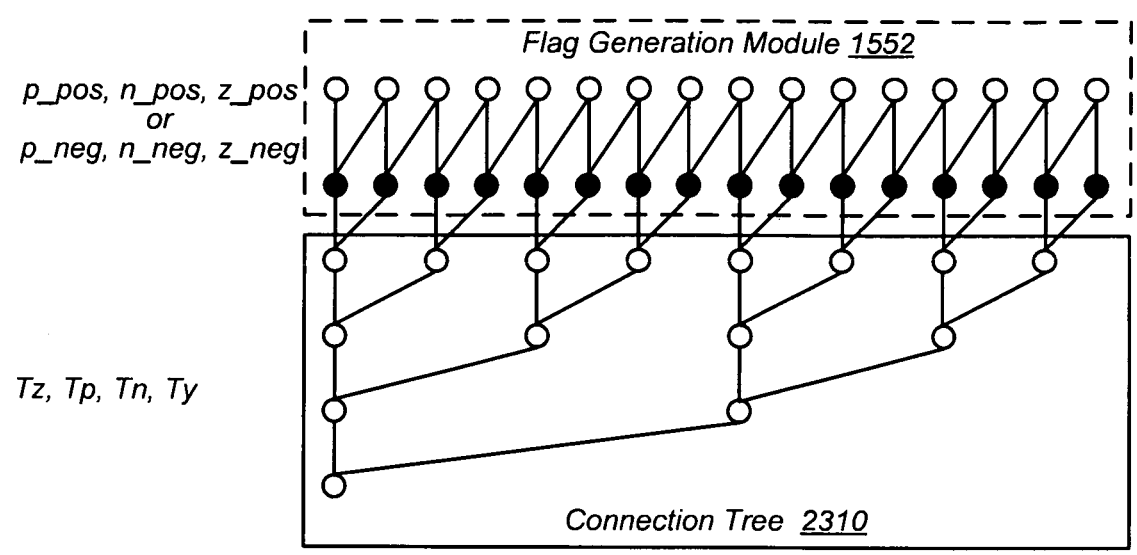
FIG. 23 illustrates one embodiment of flag generation module 1552 interfacing with a correction tree 2310.

In one embodiment, the correction tree 1554 for negative W has the same structure as the correction tree 1556 for positive W, and $Y_{sub,neg}=Ty_{4,0}$. FIG. 23A shows the structure of a correction tree 2310 that may be used to implement each of correction trees 1554 and 1556. FIG. 23 also shows the flag generation module 1552.

The sign value used to control the multiplexer 1558 is generated by network 215. The sign value is the carry-out from the most significant digit from network 215. In one alternative embodiment, the positive and negative trees are combined into a single tree.

Referring once again to FIG. 15, the encoding tree 1514 generates the preliminary LZC ($PLZC_{sub}$) from the P vector. To handle catastrophic cancellation correctly, $PLZC_{sub}$ may be decremented by one if the second operand, CB, is right-shifted. To reduce the latency, both $PLZC_{sub}$ and $PLZC_{sub}$−(RSA>0) may be incremented, and the sign signal from the network 215 and the $Y_{sub}$ signal from the correction module 1550 may be used to select the correct LZC for effective subtraction. The R box may be used to correctly handle infinity and NaNs. In this adder, the LZC may be set to 15 if either input is NaN or infinity or the result is zero.

LZA Examples

To provide a better understanding of the mechanisms for leading zero anticipation, FIGS. 24A-C show examples of leading zero anticipation for eight digits with effective subtraction and addition. $PLZC_{add}$ and $PLZC_{sub}$ are the preliminary LZC for effective addition and effective subtraction, respectively. Note $CA_{shift}$ and $CB_{shift}$ are not used in DFP adder illustrated in FIG. 2; they are shown in the examples to provide a better understanding of the described mechanisms, and represent the significands after the operand alignment, but without pre-correction. FIG. 24A shows an example of effective subtraction in which there is a positive result and the correct signal $Y_{sub,pos}$ is equal to one. FIG. 24B provides an example of effective subtraction that produces a negative result and the correct signal $Y_{sub,neg}$ is equal to zero. FIG. 24C demonstrates an example for effective addition with the correction signal $Y_{add}$ equal to one.

Design of the LZA

Returning now to FIG. 13, subtractor 1315 corrects $LZC_A$ (the LZC of the operand A) by subtracting the left shift amount LSA from $LZC_A$. In one embodiment, the subtractor 1315 is a 4-bit subtractor.

The corrected version of $LZC_A$, denoted $LZCA_{shift}$, along with $LZC_B$ (the LZC of the second operand) and the carry and sum from the decimal digit adder array, enter the LZA 1325 for effective addition. In the other path, several miscellaneous signals enter a random logic block 1320 to generate a signal special_op, to indicate the occurrence of zero, infinity, Signaling NaN, and Quiet NaN operands. Another signal, normal_op, is also generated from this random logic block to select the appropriate LZA value at the end. The signals carry and sum of W, RSA>0, and special_op enter the LZA 1330 for effective subtraction. In one embodiment, the LZA 1330 may be 17 digits wide to accommodate the case in which there is a one-digit right shift and catastrophic cancellation occurs. The final LZC of the result may be selected based on whether both operands are normal as well as the EOP.

In one set of embodiments, the DFP adder 200 may be implemented in Verilog RTL. The adder may be synthesized using the TSMC 45 nm bulk technology and a CAD tool flow. (TMSC is a acronym for Taiwan Semiconductor Manufacturing Company.) The CAD flow tool may include one or more industrial CAD tools, e.g., the Synopsys Design Compiler (DC) for design compilation and IC Compiler (ICC) for cell placement.

Figure 25:
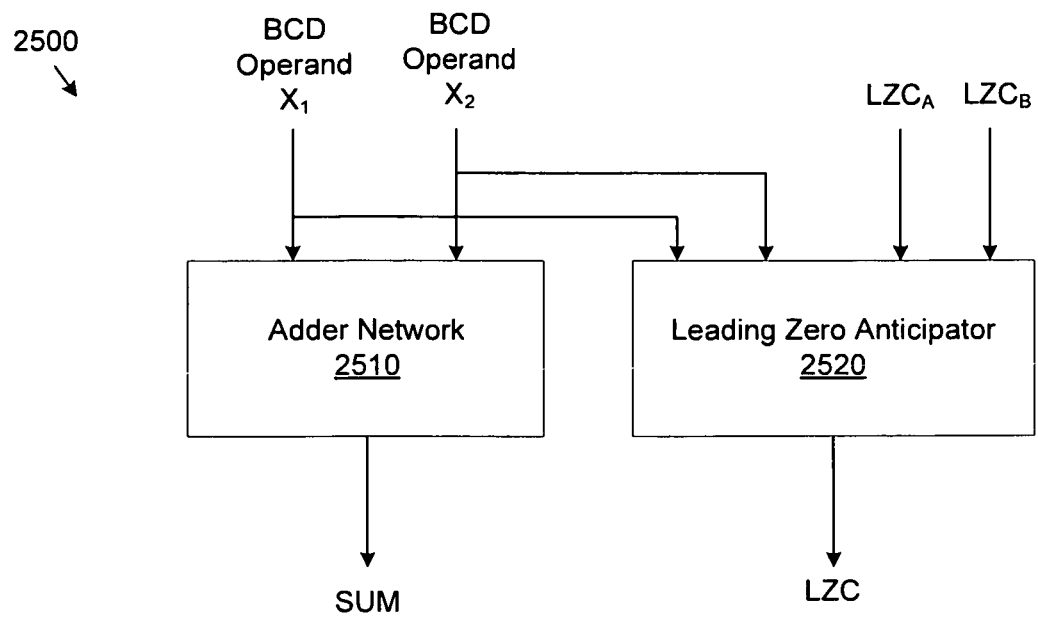
FIG. 25 illustrates one embodiment of a system including an adder network and a leading zero anticipator.

In one set of embodiments, a system 2500 for performing a sum or difference of two decimal floating-point (DFP) operands may include an adder network 2510 and a leading zero anticipator (LZA) 2520, as shown in FIG. 25. (The union of the leading zero anticipator 213 and network 215 described above is to be interpreted as one embodiment of system 2500.)

The adder network 2510 may be configured to generate a sum of a first data value $X_1$ and a second data value $X_2$ (e.g., as described above in connection with network 215). The first and second data values may be derived from first and second DFP operands.

The leading zero anticipator 2520 may be configured to generate an output value (LZC) based on data including the first data value $X_1$, the second data value $X_2$, a leading zero count $LZC_A$ of a significand of the first DFP operand, and a leading zero count $LZC_B$ of a significand of the second DFP operand. The output value LZC is equal to a leading zero count of a significand of a sum or a difference of the first and second DFP operands. The leading zero anticipator is configured to generate the output value LZC without waiting for the adder network 2510 to finish generation of the sum of the first data value and second data value.

The adder network 2510 and LZA 2520 may be configured to operate at least partially in parallel. In some embodiments, the adder network 2510 may include a parallel prefix network. In one embodiment, the adder network includes a binary Kogge-Stone network (e.g., as shown in FIG. 8).

In some embodiments, the system 2500 may also include a preprocessing circuit. The preprocessing circuit may be configured to: receive the significands of the first and second DFP operands; correct the significands based on an effective operation signal in order to obtain corrected operands; conditionally swap the corrected operands based on a swap control signal in order to obtain intermediate operands; and shift the intermediate operands in order to obtain the first and second data values. In one embodiment, the preprocessing circuit includes precorrection units 205A and 205B, units 207A and 207B, multiplexers 209A and 209B, and shifters 211A and 211B shown in FIG. 2. In this embodiment, the values $CA_3$ and $CB_3$ generated by the shifters are to be interpreted as the BCD operands $X_1$ and $X_2$.

Figure 26:
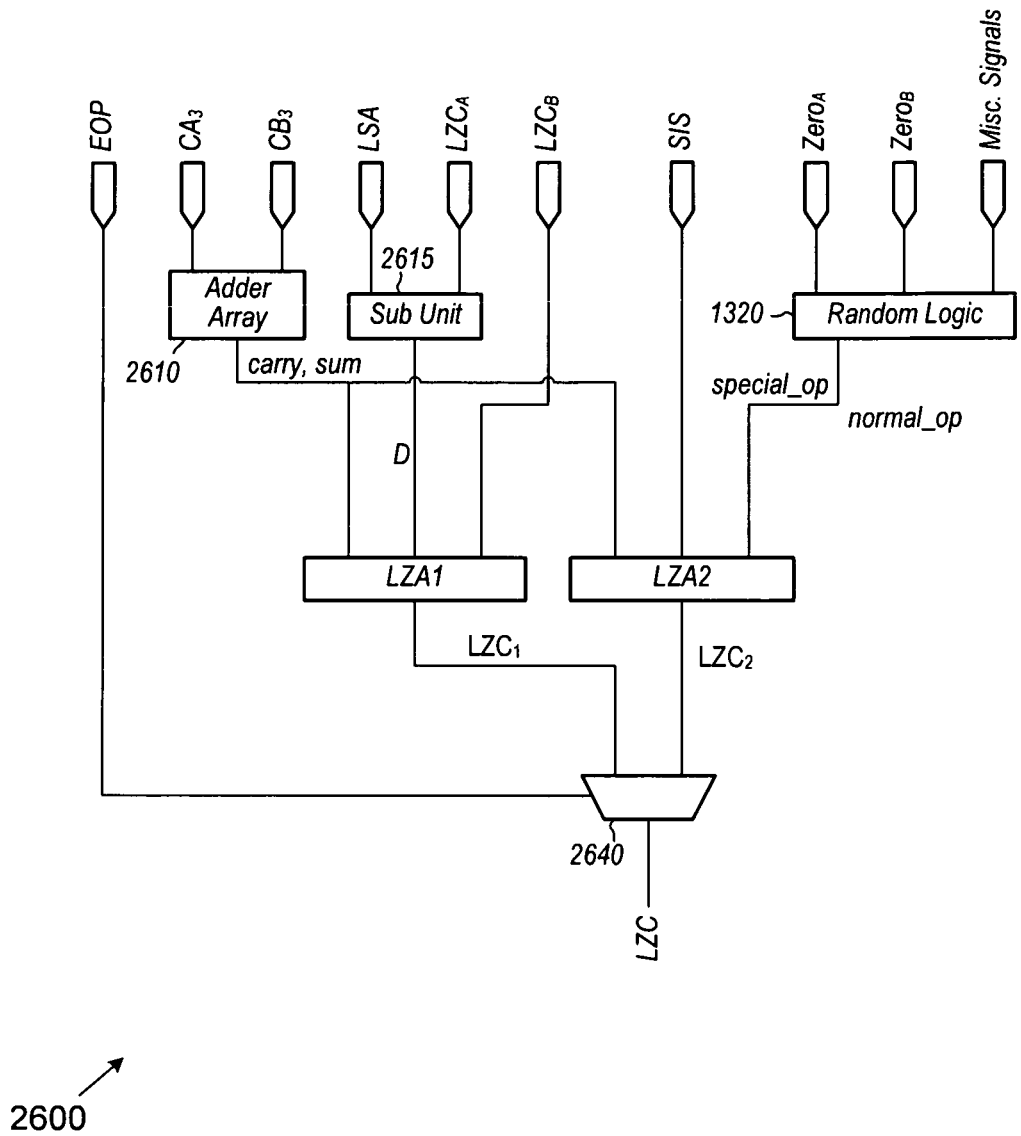
FIG. 26 illustrates one embodiment of a system for performing leading zero anticipation.

In one set of embodiments, a system 2600 may be configured for anticipating a number of leading zeros in a significand of a decimal floating-point (DFP) result, as shown in FIG. 26. The result may represent (or correspond to) a sum or a difference of first and second DFP operands. The system 2600 may include an adder array 2610, a subtraction unit 2615, a first anticipator circuit LZA1, a second anticipator circuit LZA2 and a multiplexer 2640. (LZA 213 described above is to be interpreted as one embodiment of system 2600.)

The adder array 2610 may be configured to perform a decimal digit addition of a first data value ($CA_3$) and a second data value ($CB_3$) to generate a carry operand and a sum operand. The first and second data values may be corrected significands for the first and second DFP operands (e.g., corrected in order to obtain the correct carry vector in the network 215). The subtraction unit 2615 may be configured to compute a difference value D by subtracting a left shift amount LSA and a first count value $LZC_A$. The first count value may represent a number of leading zeros in a significand of the first DFP operand.

The first anticipator circuit $LZA_1$ may be configured to generate a first leading zero count $LZC_1$ based on the carry operand, the sum operand, the difference value D and a second count value $LZC_B$. The second count value may represent a number of leading zeros in a significand of the second DFP operand. The second anticipator circuit $LZA_2$ may be configured to generate a second leading zero count $LZC_2$ based on data including the carry operand, the sum operand and a shift indication signal SIS. The multiplexer 2640 may be configured to select one of the first leading zero count and the second leading zero count based on an effective operation signal that indicates an effective operation (being performed by an adder network).

The first anticipator circuit $LZA_1$ may be specialized (or optimized) for the condition that the carry and sum operands represent a positive value. The second anticipator circuit $LZA_2$ may be specialized (or optimized) for the condition that the carry and sum operands represent a negative value. (LZA 1325 is to be interpreted as one embodiment of $LZA_1$. LZA 1330 is to be interpreted as one embodiment of $LZA_2$.)

In some embodiments, the system 2600 may also include a parallel prefix network that is configured to add the first data value and second data value. In one embodiment, the parallel prefix network includes a binary Kogge-Stone network.

In some embodiments, the system 2600 may include a shift amount unit (e.g., shift amount unit 240 as described above) that is configured to generate the LSA and the shift indication signal in response to receiving: (a) an exponent EA of the first DFP operand, (b) an exponent EB of the second DFP operand, (c) the first count value $LZC_A$, and (d) the second count value $LZC_B$.

The EOP indicator signal indicates the effective operation (addition or subtraction) that is performed to determine the DFP result. The shift indication signal may indicate whether the second DFP operand is shifted for quantum alignment. (In some embodiments, the shift indication signal is asserted only when the second DFP operand needs to be shifted.)

The system 2600 may be included in a microprocessor that is configured to read program instructions from a memory and to execute the program instructions. Alternatively, the system may be included in a dedicated circuit such as an application specific integrated circuit (ASIC).

The set of data used by the second anticipator circuit $LZC_2$ may also include an second indicator signal that indicates a special operation. For example, the indicator signal may indicate whether the result is zero in effective subtraction, whether both operands are zero, or whether either operand is Infinity, Quiet NaN, or Signaling NaN.

Figure 27:
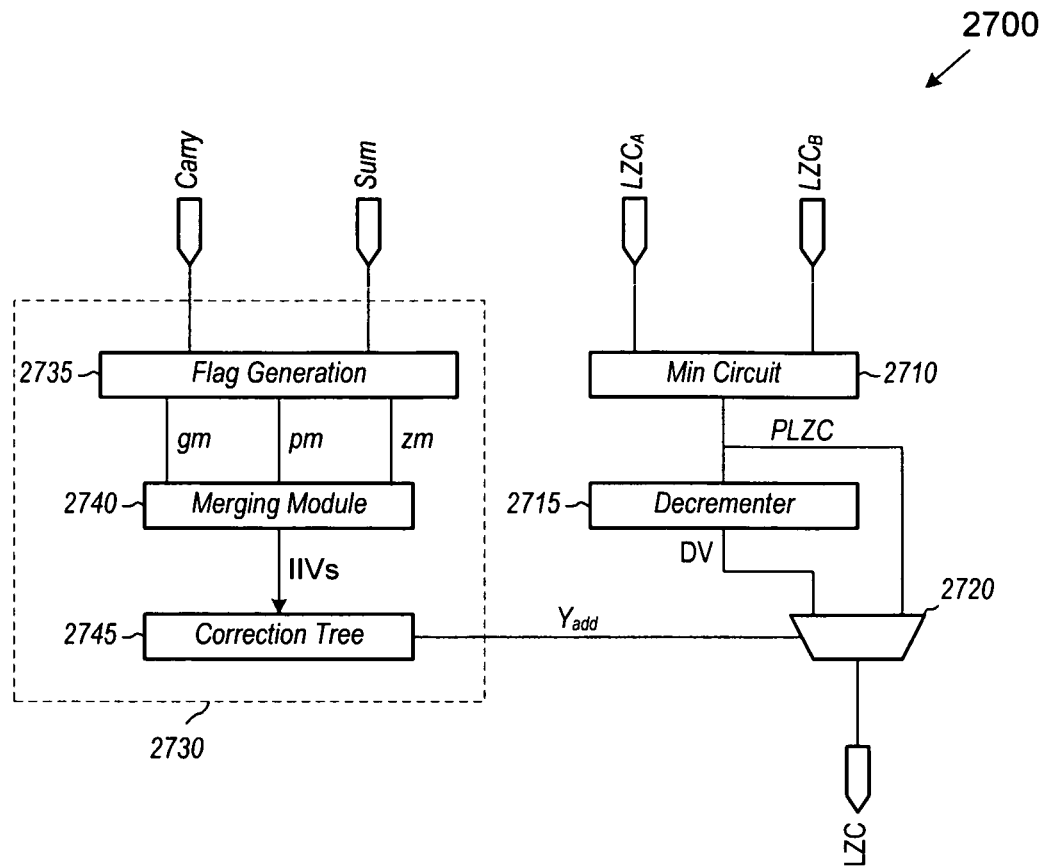
FIG. 27 illustrates one embodiment of a system for performing leading zero anticipation in the case of addition being the effective operation.

In one set of embodiments, a system 2700 for performing leading zero anticipation may be configured as shown in FIG. 27. The system 2700 may include a minimum circuit 2710, a decrementer 2715, a multiplexer 2720 and a logic unit 2730. The minimum circuit 2710 may be configured to receive a first count value $LZC_A$ and a second count value $LZC_B$. The first count value may represent a leading zero count of a significand of a first decimal floating point (DFP) operand. The second count value may represent a leading zero count of a significand of a second DFP operand. The minimum circuit 2710 may be configured to generate a preliminary leading zero count (PLZC) equal to the minimum of the first count value and the second count value.

The decrementer 2715 may be configured to decrement the preliminary leading zero count to obtain a decremented value DV. The multiplexer 2720 may be configured to select one of the preliminary leading zero count PLZC and the decremented value DV based on a selection control signal $Y_{add}$. The output value LZC generated by the multiplexer represents a leading zero count of a significand of a sum of the first DFP operand and the second DFP operand. The logic unit 2730 may be configured to generate the selection control signal $Y_{add}$ based on a carry operand and a sum operand.

In some embodiments, the logic unit 2730 may include a flag generation module 2735. The flag generation module 2730 may be configured to generate a propagate indication vector pm, a generate indication vector gm and a zero indication vector zm based on the carry operand and the sum operand. Furthermore, the logic unit 2730 may also include a merging module 2740 and a logic tree structure 2745. The merging module 2740 may be configured to generate intermediate indicator vectors IIVs (e.g., vectors y, p and z described above) based on the propagate indication vector pm, the generate indication vector gm and the zero indication vector zm. The logic tree structure 2745 may be configured to generate the selection control signal $Y_{add}$ based on the intermediate indicator vectors.

In some embodiments, the quantum of the first DFP operand is aligned to a quantum of the second DFP operand, e.g., prior to a time when the carry operand and sum operand are computed.

Figure 28:
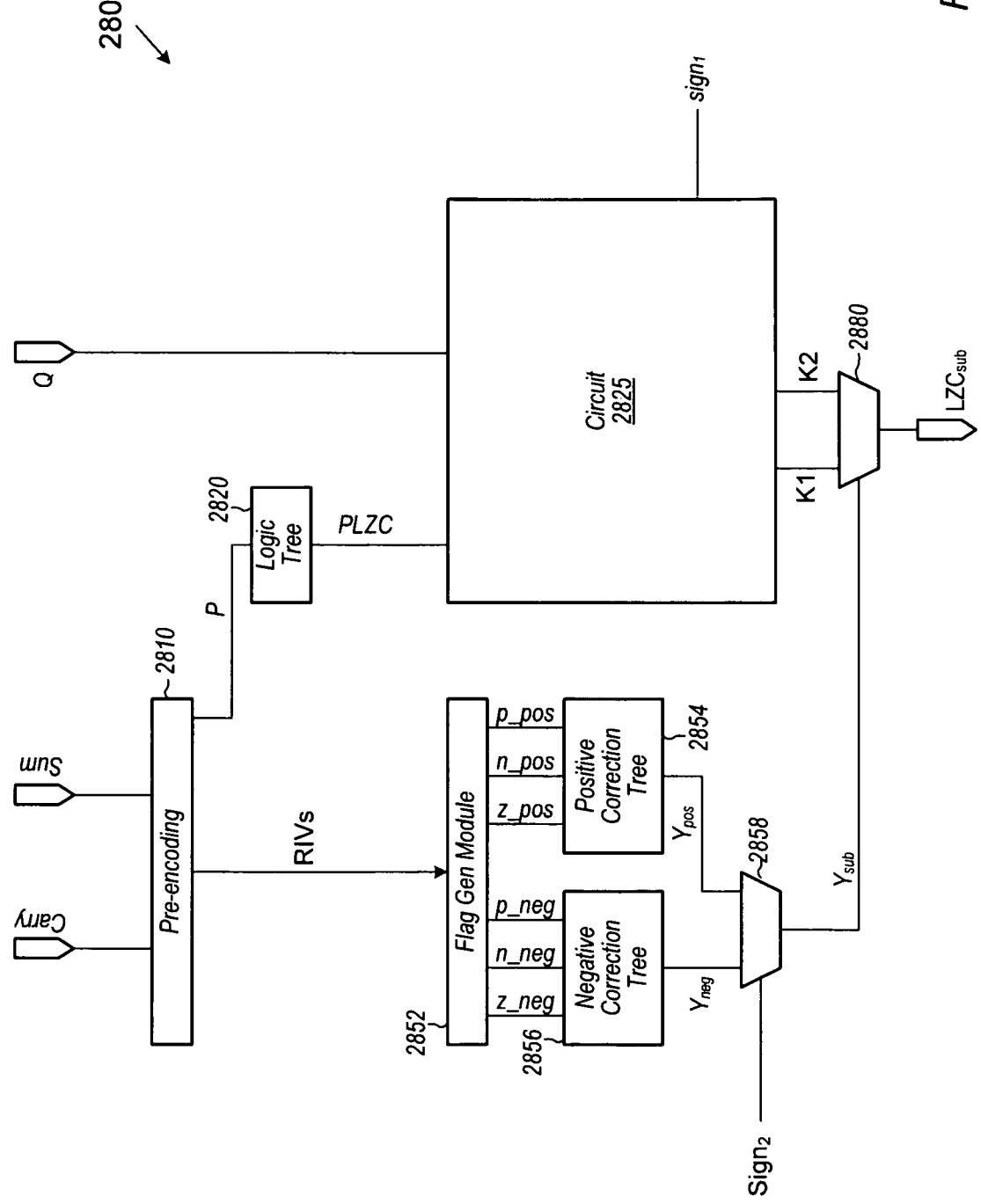
FIG. 28 illustrates one embodiment of a system for performing leading zero anticipation in the case of subtraction being the effective operation.

In one set of embodiments, a system 2800 for performing leading zero anticipation may be configured as shown in FIG. 28. The system 2800 may include a preliminary encoding module 2810, a logic tree 2820, a circuit 2825 and an output multiplexer 2880. (Subtraction LZA 1330 is to be interpreted as one embodiment of system 2800.)

The preliminary encoding module 2810 may be configured to generate a set of range indicator vectors RIVs based on a carry operand and a sum operand, and to generate a preliminary indicator vector P based on the set of range indicator vectors. The carry operand and sum operand represent a result W of a decimal digit addition of a significand of a first DFP operand and a significand of a second DFP operand. Each of the range indicator vectors corresponds to a different range test (such as the tests described above in connection with vectors s9, s2, s1, zero, g1, g2 and g9). The bits of a range indicator vector indicate whether the corresponding digits of W satisfy the test for that vector. The preliminary indicator vector P indicates whether digits of an output value of the effective decimal subtraction are zero.

The logic tree 2820 may be configured to generate a preliminary leading zero count PLZC based on the preliminary indicator vector P. The PLZC represents a leading zero count corresponding to an effective decimal subtraction of the two DFP operands.

The circuit 2825 may be configured to generate two output values $K_1$ and $K_2$ based on data including the PLZC, a first sign bit input ($sign_1$) and a control bit Q. One of the two output values equals the PLZC. A second of the two output values equals an alternative value. (The alternative value may be PLZC+1 or PLZC−1, e.g., depending on the sign of the effective subtraction output and the control bit input. The control bit input may be a signal indicating whether there is a shift on the second operand.

The output multiplexer 2880 may be configured to select one of the two output values ($K_1$ or $K_2$) based on a selection control signal $Y_{sub}$. The selection control signal may be determined based on the set of range indicator vectors and a second sign bit input ($sign_2$). The selected output value $LZC_{sub}$ represents a leading zero count of a significand of a difference of the first DFP operand and the second DFP operand.

In some embodiment, the system 2800 may also include a flag generator module 2852. The flag generator module 2852 may be configured to generate a first set of flag vectors and a second set of flag vectors based on the range indicator vectors. The first set of flag vectors may include a zero-digit indicator vector z_pos, a leading non-zero digit indicator vector p_pos and trailing terminate indicator vector n_pos for the result W corresponding to the condition that W is positive. The second set of flag vectors may include a zero-digit indicator vector z_neg, a leading non-zero digit indicator vector p_neg and a trailing terminate indicator vector n_neg for the result W corresponding to the condition that W is negative.

In some embodiments, the system 2800 may also include a positive correction tree 2854, a negative correction tree 2856 and a multiplexer 2858. The positive correction tree 2854 may be configured to generate a first candidate signal $Y_{pos}$ based on the first set of flag vectors. The negative correction tree 2856 may be configured to generate a second candidate signal Y_neg based on the second set of flag vectors. The multiplexer 2858 may be configured to select one of the first and second candidate signals as the selection control signal Y_sub based on the second sign bit input $Sign_2$.

In one embodiment, a quantum of the first DFP operand is aligned to a quantum of the second DFP operand.

While some of the embodiments described above refer to specific bit lengths for various operands, those lengths are to be interpreted as examples. The principles disclosed herein naturally generalize to any desired lengths.

The following two technical papers are hereby incorporated by reference in their entireties: (1) "Decimal Floating-point adder and multifunction unit with injection-based rounding", L.-K. Wang and M. J. Schulte, Proceedings of the $18^{th}$ IEEE Symposium on Computer Arithmetic, Montpellier, France, June 2007 (hereinafter "CA2007"); and (2) "Hardware designs for decimal Floating-point addition and related operations", L.-K. Wang, M. J. Schulte, J. D. Thompson, and N. Jairam, IEEE Transactions on Computers, 58 (3), March 2009 (hereinafter "TOC2009").

It is noted that one embodiment of post-correction unit 219 as disclosed hereinabove may be implemented according to additional details regarding the "post-correction unit" disclosed in CA2007 and TOC2009. One embodiment of SAR unit 223 as disclosed hereinabove may be implemented according to additional details regarding the "shift and round unit" disclosed in CA2007 and TOC2009. One embodiment of network 215 as disclosed hereinabove may be implemented according to additional details regarding the "Kogge-Stone network" disclosed in CA2007 and TOC2009. One embodiment of sign and exception unit 217 as disclosed hereinabove may be implemented according to additional details regarding the "sign unit" and "overflow unit" disclosed in CA2007 and TOC2009. One embodiment of shifters 211A and 211B as disclosed hereinabove may be implemented according to additional details regarding the "decimal barrel shifters" disclosed in CA2007 and TOC2009.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for anticipating a number of leading zeros in a significand of a decimal floating-point (DFP) result, wherein the DFP result is a sum or a difference of first and second decimal floating-point (DFP) operands, the system comprising:
    an adder array configured to perform a decimal digit addition of a first data value and a second data value to generate a carry operand and a sum operand, wherein the first and second data values are corrected significands for the first and second DFP operands;
    a parallel prefix network configured to add the first and second data values;
    a subtraction unit configured to compute a difference value by subtracting a left shift amount (LSA) and a first count value, wherein the first count value represents a number of leading zeros in a significand of the first DFP operand;

a first anticipator circuit configured to generate a first leading zero count based on the carry operand, the sum operand, the difference value and a second count value, wherein the second count value represents a number of leading zeros in a significand of the second DFP operand;

a second anticipator circuit configured to generate a second leading zero count based on data including the carry operand, the sum operand and a shift indication signal; and a multiplexer configured to select one of the first leading zero count and the second leading zero count based on an indicator signal that indicates an effective operation.

2. The system of claim 1, wherein the parallel prefix network includes a binary Kogge-Stone network.

3. The system of claim 1, wherein the system is included in a microprocessor that is configured to read program instructions from a memory and to execute the program instructions.

4. The system of claim 1, wherein said data also includes a second indicator signal that indicates a special operation.

5. The system of claim 1, wherein said data also includes a second indicator signal that indicates whether the DFP result is zero in effective subtraction.

6. The system of claim 1, wherein said data also includes a second indicator signal that indicates whether both operands are zero.

7. The system of claim 1, wherein the system is included in an application specific integrated circuit (ASIC).

8. A method for anticipating a number of leading zeros in a significand of a decimal floating-point (DFP) result, wherein the DFP result is a sum or a difference of first and second decimal floating-point (DFP) operands, the method comprising:

performing a decimal digit addition of a first data value and a second data value to generate a carry operand and a sum operand, wherein the first and second data values are corrected significands for the first and second DFP operands;

adding the first and second data values using a parallel prefix network;

computing a difference value by subtracting a left shift amount (LSA) and a first count value, wherein the first count value represents a number of leading zeros in a significand of the first DFP operand;

generating a first leading zero count based on the carry operand, the sum operand, the difference value and a second count value, wherein the second count value represents a number of leading zeros in a significand of the second DFP operand;

generating a second leading zero count based on data including the carry operand, the sum operand and a shift indication signal; and selecting one of the first leading zero count and the second leading zero count based on an indicator signal that indicates an effective operation.

9. The method of claim 8, wherein the parallel prefix network includes a binary Kogge-Stone network.

10. The method of claim 8, wherein the method is performed by a microprocessor that is configured to read program instructions from a memory and to execute the program instructions.

11. The method of claim 8, wherein said data also includes a second indicator signal that indicates a special operation.

12. The method of claim 8, wherein said data also includes a second indicator signal that indicates whether the DFP result is zero in effective subtraction.

13. The method of claim 8, wherein said data also includes a second indicator signal that indicates whether both operands are zero.

14. The method of claim 8, wherein the method is performed by an application specific integrated circuit (ASIC).

15. A system for anticipating a number of leading zeros in a significand of a decimal floating-point (DFP) result, wherein the DFP result is a sum or a difference of first and second decimal floating-point (DFP) operands, the system comprising:

an adder array configured to perform a decimal digit addition of a first data value and a second data value to generate a carry operand and a sum operand, wherein the first and second data values are corrected significands for the first and second DFP operands;

a shift amount unit configured to generate a left shift amount (LSA) and a shift indication signal in response to receiving: (a) an exponent of the first DFP operand, (b) an exponent of the second DFP operand, (c) a first count value, and (d) a second count value, wherein the first count value represents a number of leading zeros in a significand of the first DFP operand, wherein the second count value represents a number of leading zeros in a significand of the second DFP operand;

a subtraction unit configured to compute a difference value by subtracting the LSA and the first count value;

a first anticipator circuit configured to generate a first leading zero count based on the carry operand, the sum operand, the difference value and the second count value;

a second anticipator circuit configured to generate a second leading zero count based on data including the carry operand, the sum operand and the shift indication signal; and a multiplexer configured to select one of the first leading zero count and the second leading zero count based on an indicator signal that indicates an effective operation.

16. A system for anticipating a number of leading zeros in a significand of a decimal floating-point (DFP) result, wherein the DFP result is a sum or a difference of first and second decimal floating-point (DFP) operands, the system comprising:

an adder array configured to perform a decimal digit addition of a first data value and a second data value to generate a carry operand and a sum operand, wherein the first and second data values are corrected significands for the first and second DFP operands;

a subtraction unit configured to compute a difference value by subtracting a left shift amount (LSA) and a first count value, wherein the first count value represents a number of leading zeros in a significand of the first DFP operand;

a first anticipator circuit configured to generate a first leading zero count based on the carry operand, the sum operand, the difference value and a second count value, wherein the second count value represents a number of leading zeros in a significand of the second DFP operand;

a second anticipator circuit configured to generate a second leading zero count based on data including the carry operand, the sum operand and a shift indication signal, wherein the shift indication signal indicates whether the second DFP operand is shifted for quantum alignment; and a multiplexer configured to select one of the first leading zero count and the second leading zero count based on an indicator signal that indicates an effective operation, wherein the indicator signal indicates whether the DFP result corresponds to an effective addition or an effective subtraction.

17. A method for anticipating a number of leading zeros in a significand of a decimal floating-point (DFP) result, wherein the DFP result is a sum or a difference of first and second decimal floating-point (DFP) operands, the method comprising:
- performing a decimal digit addition of a first data value and a second data value to generate a carry operand and a sum operand, wherein the first and second data values are corrected significands for the first and second DFP operands;
- generating a left shift amount (LSA) and a shift indication signal in response to receiving: (a) an exponent of the first DFP operand, (b) an exponent of the second DFP operand, (c) a first count value, and (d) a second count value, wherein the first count value represents a number of leading zeros in a significand of the first DFP operand, wherein the second count value represents a number of leading zeros in a significand of the second DFP operand;
- computing a difference value by subtracting the LSA and the first count value;
- generating a first leading zero count based on the carry operand, the sum operand, the difference value and the second count value;
- generating a second leading zero count based on data including the carry operand, the sum operand and the shift indication signal; and
- selecting one of the first leading zero count and the second leading zero count based on an indicator signal that indicates an effective operation.

18. A method for anticipating a number of leading zeros in a significand of a decimal floating-point (DFP) result, wherein the DFP result is a sum or a difference of first and second decimal floating-point (DFP) operands, the method comprising:
- performing a decimal digit addition of a first data value and a second data value to generate a carry operand and a sum operand, wherein the first and second data values are corrected significands for the first and second DFP operands;
- computing a difference value by subtracting a left shift amount (LSA) and a first count value, wherein the first count value represents a number of leading zeros in a significand of the first DFP operand;
- generating a first leading zero count based on the carry operand, the sum operand, the difference value and a second count value, wherein the second count value represents a number of leading zeros in a significand of the second DFP operand;
- generating a second leading zero count based on data including the carry operand, the sum operand and a shift indication signal, wherein the shift indication signal indicates whether the second DFP operand is shifted for quantum alignment;
- selecting one of the first leading zero count and the second leading zero count based on an indicator signal that indicates an effective operation, wherein the indicator signal indicates whether the DFP result corresponds to an effective addition or an effective subtraction.

* * * * *